United States Patent [19]
Williamson et al.

[11] Patent Number: 4,999,613
[45] Date of Patent: Mar. 12, 1991

[54] REMOTE CONFINEMENT SYSTEM

[75] Inventors: Lon A. Williamson, Westchester; Frank C. Pennypacker, Loveland, both of Ohio; Donald W. Collier, Chicago, Ill.; Kip L. Fuller, Denver, Colo.

[73] Assignee: Guardian Technologies, Inc., Cincinnati, Ohio

[21] Appl. No.: 343,860

[22] Filed: Apr. 26, 1989

Related U.S. Application Data

[63] Continuation-in-part of Ser. No. 41,698, Apr. 21, 1987, Pat. No. 4,843,377.

[51] Int. Cl.$^5$ .................. G08P 23/00; A61B 5/08; H04M 11/04
[52] U.S. Cl. .................. 340/573; 128/719; 379/38; 381/42; 340/516; 340/529; 340/825.44
[58] Field of Search .......... 340/573, 576, 539, 825.49, 340/825.44, 538, 527, 309.15, 514, 516, 529; 180/272; 379/38, 40; 381/42; 382/3-4; 358/105, 108; 128/719, 632, 637; 40/665

[56] References Cited

U.S. PATENT DOCUMENTS

| | | | |
|---|---|---|---|
| 3,478,344 | 11/1969 | Schwitzgebel et al. | 340/539 X |
| 3,525,811 | 8/1970 | Trice et al. | 381/42 |
| 3,752,904 | 8/1973 | Waterbury | 358/84 |
| 3,764,270 | 10/1973 | Collier et al. | 128/719 X |
| 3,809,067 | 5/1974 | Hoppesch | 340/576 X |
| 3,842,345 | 10/1974 | Padgitt et al. | 324/71.1 |
| 3,873,771 | 3/1975 | Kleinerman et al. | 370/1 X |
| 3,903,726 | 9/1975 | Hirosawa et al. | 73/23 |
| 3,983,535 | 9/1976 | Herbst et al. | 382/3 |
| 3,989,896 | 11/1976 | Reitboeck | 381/42 X |
| 4,093,945 | 6/1978 | Collier et al. | 340/52 R X |
| 4,136,338 | 1/1979 | Antenore | 340/551 |
| 4,285,146 | 8/1981 | Charles et al. | 40/665 |

(List continued on next page.)

FOREIGN PATENT DOCUMENTS 0122888 10/1984 European Pat. Off. .
0212947 3/1987 European Pat. Off. .
2818955 4/1978 Fed. Rep. of Germany .
8501582 4/1985 PCT Int'l Appl. .
8707723 12/1987 World Int. Prop. O. .

OTHER PUBLICATIONS

BI Inc., Boulder, Colo.; *General Comments About the Home Escort System*, 1985, 31 pages.
Voxtron Systems, Inc., *Provotron A Computerized Telemonitoring System*, Nov. 10, 1986, 15 pages.
A. K. Schmidt, "Electronic Monitoring Equipment", NIJ Reports, Feb. 28, 1986.

*Primary Examiner*—Glen R. Swann, III
*Assistant Examiner*—Thomas J. Mullen, Jr.
*Attorney, Agent, or Firm*—Wood, Herron & Evans

[57] ABSTRACT

A remote confinement system provides a plurality of different unsupervised tests to determine the presence, identity or conduct of the prisoner. The tests preferably include an RF test performed continuously with an RF transmitter attached to the prisoner and a receiver at the remote location, a schedulable voice test performed to identify a person as the specified prisoner, and a breath alcohol test to determine the prisoner's sobriety. The tests are performed with equipment at the remote location in accordance with test selections and schedules selected in a prior automated communication with a central office computer. Events which include test results are communicated to the central office upon a selectively established communications link to the central office, in reply to which communication information selecting subsequent tests procedures or scheduling is communicated from the host to and stored at the remote location. The information communicated from the host includes an identification code for the transmitter attached to the specified prisoner. The RF test generates a message for transmission to the central unit when the prisoner enters or leaves the remote location, but sounds a warning if the signal is lost and delays transmission of the message to allow the prisoner to return following his departure.

43 Claims, 9 Drawing Sheets

U.S. PATENT DOCUMENTS

| | | | |
|---|---|---|---|
| 4,549,044 | 10/1985 | Durham | 379/40 |
| 4,558,181 | 12/1985 | Blanchard et al. | 379/40 |
| 4,578,539 | 3/1986 | Townsing | 379/97 |
| 4,593,273 | 6/1986 | Narcisse | 340/539 |
| 4,598,275 | 7/1986 | Ross et al. | 340/573 |
| 4,613,845 | 9/1986 | DuBois | 340/52 R |
| 4,665,385 | 5/1987 | Henderson | 340/539 |
| 4,670,781 | 6/1987 | Aubert et al. | 358/93 |
| 4,675,656 | 6/1987 | Narcisse | 340/539 |
| 4,691,340 | 9/1987 | Maeda et al. | 379/96 |
| 4,706,689 | 11/1987 | Man | 340/539 X |
| 4,715,059 | 12/1987 | Cooper-Hart et al. | 379/53 |
| 4,738,333 | 4/1988 | Collier et al. | 340/576 X |
| 4,747,120 | 5/1988 | Foley | 379/38 |
| 4,843,377 | 6/1989 | Fuller et al. | 340/573 |

HMU

REMOTE CONFINEMENT SYSTEM

This application is a continuation-in-part of U.S. patent application Ser. No. 041,698, filed Apr. 21, 1987, and now U.S. Pat. No. 4,843,377, and entitled "Remoted Confinement System" which is hereby expressly incorporated in its entirety herein by reference.

FIELD OF THE INVENTION

The present invention relates to remote confinement systems, and more particularly, to systems for monitoring events designed to communicate to a central processing center information relating to the presence identity and conduct of the confined person assigned to the remote location.

BACKGROUND OF THE INVENTION

The concept of remote confinement, often referred to as home arrest, is an alternative to institutional incarceration of prisoners and an aid to probation. It has developed in recent years to relieve the overcrowding of jails and to provide a more preferred method of punishment and rehabilitation for those convicted of criminal offenses of a nonviolent or lesser type.

The background of the remote confinement concept is generally supported in the above incorporated parent application Ser. No. 041,698.

Remote confinement systems have as one of their primary goals the monitoring of the presence of an assigned prisoner at his home or such remote location to which he is assigned for confinement. The purpose of the monitoring is to insure, by information reported to a central office, that the assigned prisoner has remained or is confined in accordance with the terms of his home arrest sentence. Two general categories of presence monitoring have been proposed. Continuous monitoring has been proposed in order to determine any departure of the prisoner from the remote confinement location. Such systems employ remote monitoring units which detect prisoner departures from the remote location and then to communicate information to a central office to notify a supervising entity of violations. Such continuous monitoring is usually provided by the attachment to the assigned prisoner of a transmitter which generates at shortly spaced intervals a signal to a home receiver unit permanently installed at the place of remote confinement, such as at the prisoner's home, to verify that the transmitter is in proximity to the home. Such devices provide an advantage in that the signals will be generated from the transmitter less dependent on the willingness or ability of the prisoner to cooperate, and accordingly, the presence of the prisoner can with such devices be monitored throughout the day and night and whether the prisoner is awake or asleep.

Scheduled testing of the presence of a prisoner at the remote location is, however, more practical where tests are employed requiring in part the cooperation of the prisoner. Such concepts may include prisoner identification by the delivery of a voice sample at the remote location. They may also include prisoner testing by providing the performance of a test upon or by the prisoner. In home confinement systems used in combination with behavioral testing such as breath alcohol testing as described in accordance with the teachings of parent application Ser. No. 041,698, the voice identity test, performed in combination, will provide a highly reliable method of verifying the identity of the person delivering a breath sample. As a mere indication of the presence of the prisoner at the remote location, voice tests or other scheduled tests requiring the cooperation of the prisoner are less suited for use during periods when the prisoner is asleep.

Furthermore, neither type of system, either the continuous or the scheduled testing type, provide constraint upon the prisoner which is adequate or appropriate in many cases. Accordingly, there exists a need to provide for alternative types of prisoner monitoring without unduly restricting the flexibility or compromising the economy of the system.

Furthermore, the use of RF transmitters physically attached to the prisoner has in the prior art required replacement of the transmitters or the assignment of transmitters after the home unit has been installed in the prisoner's home. As a result, provision has been made for verifying the identity of the specific transmitter by code reading means included in the home unit. Such means have, however, required a service call to the home unit to match the code of the unit with a number of the new transmitter. Since that number is usually unknown, and different than a number known, at the time of the home unit's installation. Accordingly, if the system were to require that the home unit validate the transmission before initiating a call to the central office, a service call is required to set the receiver to recognize the transmitter code. Otherwise, every transmitter signal would have to be transmitted to the central office for identification of the transmitter. This would burden the central unit of the system. The need for such service calls from a probation office to the confinement location, as well as the repeated transmission of information to the central office, unnecessarily add to the cost of operation of the home confinement system.

The provision of home units which are capable of monitoring events associated with the monitoring and testing of the prisoner have required the use of home units particularly equipped for specific types of monitoring. In situations, however, where the particular terms of confinement of a specific prisoner are different from those of other prisoners on the same confinement system, the need to supervise multiple individual home units which perform only certain tests appropriate for the particular prisoner have been required. This also involves the need for service calls to the home unit, or to the setting of the home unit before installation so that it will respond to only the test appropriate for the particular prisoner. However, where it becomes necessary to alter the test after the home unit is installed, or to change the nature or scheduling of the tests throughout the day such units of the prior art have lacked flexibility. Accordingly, there is a need to improve the flexibility of remote confinement systems.

In home confinement systems of the prior art, information has been communicated between the remote location and the central location. Each of these communications occupies a certain amount of time. Such communications of the prior art have included reporting of various events which may or may not contain information concerning the presence of the prisoner or his conduct. The reporting of the events has in the prior art included transmissions of signals which falsely report the presence or absence of a prisoner or the presence or absence of a proper response or result from a test. Furthermore, the reporting of information from the home unit to the central office consumes online time which expands the cost of central office equipment necessary to service a particular number of prisoners. Accordingly, there is a need to relieve the demand per confined prisoner on the central unit and to thereby increase the capacity of remote confinement systems to service more prisoners.

SUMMARY OF THE INVENTION

It has been a general objective of the present invention to provide a remote confinement system which may flexibly accommodate the need to provide tests for presence, identity, and behavior of a prisoner at a remote confinement location. It has been a more particularly objective of the present invention to provide such a remote confinement system in which continuous and programmed contact with the prisoner may be effectively used in combination in an automated manner.

It has been a particular objective of the present invention to provide for configuration of the units at the home arrest locations form the central office and to reduce the number of service calls to a minimum. It has been a further objective of the present invention to provide such a remote confinement system which further conserves the amount of online time of the central unit, reduces the time of the central unit personnel to a minimum and increases the number of remote units which may be serviced by a particular central processing center of a home arrest system.

With RF monitoring systems of the prior art, it has been found that such transmitters may fail to generate a signal of sufficient strength for communicating or being received by the home monitoring unit even when the prisoner is within proximity of the remote location. This is because the radiation patterns of the transmitter and the receiving patterns of the antenna may not be uniform in the vicinity of the remote location or because the transmitter may enter an area where its signals are shielded. It has been found that conductive objects or structure may shield the signal from the transmitter resulting in a failed communication to the home monitoring unit. This results in a false indication detected by the receiving unit that the prisoner has departed from the location. In addition, the immersion of the transmitter in water such as a bathtub or swimming pool will usually interfere with the transmission of signals sufficiently strong for detection. What is worse, the prisoner may not be aware that the signal has been lost and thus may fail to correct the problem before a false departure signal is sent to the host or central unit.

In the prior art, an unduly large number of false signals are generated in this manner. Where the generation of such signals constitutes a reportable event involving a communication to the central unit, unduly large amounts of information are communicated to the central unit and the online time of the central unit is unnecessarily preoccupied with the receipt of signals which may indicate only temporary loss of RF communication from the prisoner to the receiver at the remote confinement location.

It is a further objective of the present invention to provide greater protection from circumvention by the prisoner of the presence identity and testing requirements of the system.

According to the principles of the present invention, there is provided a remote confinement system capable of accommodating a plurality of tests for monitoring events at the remote location and for determining the presence, identity or conduct of the prisoner in a combination selected, timed or scheduled from the central unit. More particularly, there is provided a method and apparatus for communicating information between the central unit and the home arrest location in a manner which will enable a selection from the central unit of the times and types of the various tests. Specifically, the system is provided with a home monitoring unit which receives from a central or host unit the type and time of the next test.

In accordance with the principles of the present invention, there is provided in the preferred and illustrated embodiment, a home arrest system in which a transmitter is attached to a specified prisoner to transmit signals at frequent intervals and to thereby provide for continuous determination of the presence of the prisoner at the remote location. The system of the preferred embodiment is provided with a unit at the remote location which receives transmitted signals from a transmitter attached to the prisoner, and includes a breath alcohol tester for performing a breath alcohol test on the prisoner in combination with a voice test to check the identity of the person delivering the breath sample for confirming that the person performing the breath test is in fact the specified prisoner. The preferred embodiment of the system further provides an ability to communicate at predetermined times with the central office and to selectively connect to a telephone line in order to receive phone calls from the central office. The performance of the various events is determined and remotely programmed by signals from the central office.

In accordance with other principles of the present invention, a home monitoring unit provided at the remote location having a processor for automatically monitoring certain conditions at the remote location such as the presence and absence of the prisoner, the performance of a breath test or the performance of a voice test, the confirmation of the identity of the person delivering the voice test, and the storing of the results of the various events at the remote location. The system is further provided with means for assigning a priority to and initiating calls from the remote location to the central unit in accordance with a priority system retained at the remote location which is updated and changed at the time of each communication to the central office by a central office reply message containing instructions for future tests and events.

In accordance with further principles of the present invention, the home monitoring unit of the remote confinement system receives from the central unit, at the time of each communication from the remote location to the central unit, information relating to the identity of the transmitter attached to the person assigned to the remote location. According to such feature, when a change in the transmitter assigned to a prisoner is made, the home monitoring unit will be informed of a change in the ID code of the transmitter without the performance of a service call.

In accordance with further principles of the present invention, there is provided in the home monitoring unit of the remote confinement system at the remote location the capability of signalling to the prisoner whenever the transmitter connected to the prisoner ceases to generate a signal which is received by the home monitoring unit. The signal provides the prisoner with sufficient time to move the transmitter within range so as to avoid the transmission of a false departure signal to the central office. In the preferred embodiment of the present invention, the home monitoring unit is provided with a means for signalling the prisoner whenever a signal from his transmitter is not received and providing the prisoner with sufficient time to come back into range or to unshield his transmitter should that be the cause of the loss of signal rather than a true departure from the remote location.

The present invention provides the advantages of reducing the need for personal service calls to the home unit by probation officers to check on falsely reported events or in order to program or set the parameters of the home unit to perform various tests or to accept substitutions of the transmitter or other equipment. The present invention provides the advantage of requiring a prisoner to report to the probation office for the assignment of transmitter equipment while allowing the operators of the system the ability to properly program the home monitoring unit in order to recognize the identity of the particular transmitter. The present invention further provides the advantages of substantially reducing the online time of the central unit monitoring equipment by reducing the number of reports of departure by the prisoner when in fact the departure signals are due to inadvertent or temporary loss of signal from the transmitter, and not from true departures of the prisoner from the remote location.

The present invention further provides the advantages of program changeability remotely from the central unit and to schedule or reschedule reportable events or to change the times and nature of the tests to be performed at the home unit. This is a particular advantage in that the operators at the central unit may, in response to information received from a particular remote location, elect to schedule a different subsequent test or the timing of future tests in response to reported information. Follow-up tests to better verify and understand the nature of the test information being reported regarding the behavior of the prisoner at the remote location can thus be performed.

These and other objectives and advantages of the present invention will be more readily apparent from the descriptions incorporated herein and set forth in the parent application, and the following detailed description of the drawings in which:

DETAILED DESCRIPTION OF THE DRAWINGS

Figure 1:
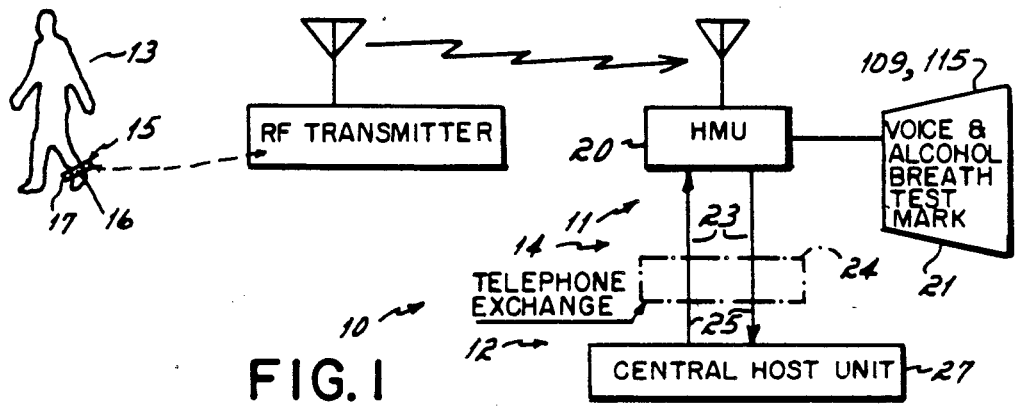
FIG. 1 is a block diagram illustrating a remote confinement system according to the principles of the present invention.

Referring to FIG. 1, a preferred embodiment of the remote confinement system 10 according to principles of the present invention is diagrammatically illustrated. The system 10 includes a remote confinement location 11, and a central office 12 from which the presence, identity and conduct of a prisoner 13 at the remote location 11 are monitored remotely through a communications link 14. The remote location 11 is usually the home of a prisoner 13, to which a particular prisoner is ordered confined for the service of a sentence in lieu of service at a penal institution.

As is further described in parent application Ser. No. 041,698 incorporated herein by reference, the remote confinement location 11 is one of a plurality of remote confinement locations at which various specified prisoners are assigned for confinement. The system 10 also includes the central office location 12 which is capable of being selectively connected through a communications link 14 to any one or more of the plurality of remote confinement locations 11. For simplicity, only one remote confinement location 11 is illustrated and hereafter described.

A prisoner 13 is, in the administration of the home confinement system 10, assigned to the remote location 11 for confinement. For providing continuous determination of the presence of the prisoner 13 at the remote location 11 there is provided attached to the prisoner 13 an anklet 15. The anklet 15 includes an RF transmitter 16 which is connectable to the ankle of the prisoner 13 through the use of a strap 17. The ankle strap 17, once connected to the prisoner 13, cannot be removed from the ankle of the prisoner 13 without being cut. The ankle strap 17 forms, either through conductors embedded therein or through the use of semiconductor material in its construction, part of a conductive circuit which will detect any cutting of the strap 17 or removal of the strap 17 from the transmitter 16. Components in the transmitter are designed to respond to the detected tampering and generate a tamper signal should the strap 17 be cut and the transmitter 16 removed from the prisoner.

The RF transmitter 16 is battery powered and continuously emits a UHF signal at regular intervals. When the prisoner 13 wearing the anklet 15 is in reasonably close proximity to the remote location 11, say for example a distance of 120 feet, a signal generated by the RF transmitter will be received by a home monitoring unit or HMU 20 installed by probation authorities at the remote location 11. The HMU 20 includes circuits for receiving the RF signal from the transmitter, to determine the presence of the prisoner 13, and circuits for implementing other tests, including scheduled tests for verifying the identity of the prisoner and the certain conduct of the prisoner 13. To accept data for these other tests, the HMU 20 has, connected to the home monitoring unit 20, a voice and alcohol test mask 21 which is designed to receive both a voice sample from the specified prisoner or any other person utilizing the mask 21 and to also receive a breath sample upon which a breath alcohol test will be performed. The mask 21 and the system components associated with the mask 21 are more particularly described in United States patent application of Patrick J. Conners et al., Ser. No. 109,815, filed Oct. 16, 1987 for A Breath Alcohol Testing System and hereby expressly incorporated into this application by reference.

The home monitoring unit 20 at the remote location 11, according to the preferred embodiment of the present invention, is connected through a phone line 23 or equivalent transmission path to a conventional telephone exchange 24. Also connected to the exchange 24 through a telephone line 25 is a central or host unit 27 at the central location 12. Through the telephone exchange 24 and transmission paths a communications link can be selectively established between the central office 12 and the remote location 11 in response to signals generated at either the remote or central locations. A number of other similar or identical home monitoring units 20 are also connected to phone lines to the telephone exchange 24 and accordingly also selectively connectable through the operation of the telephone exchange 24 to the central unit 27 at the central office 12.

Figures 2, 4:
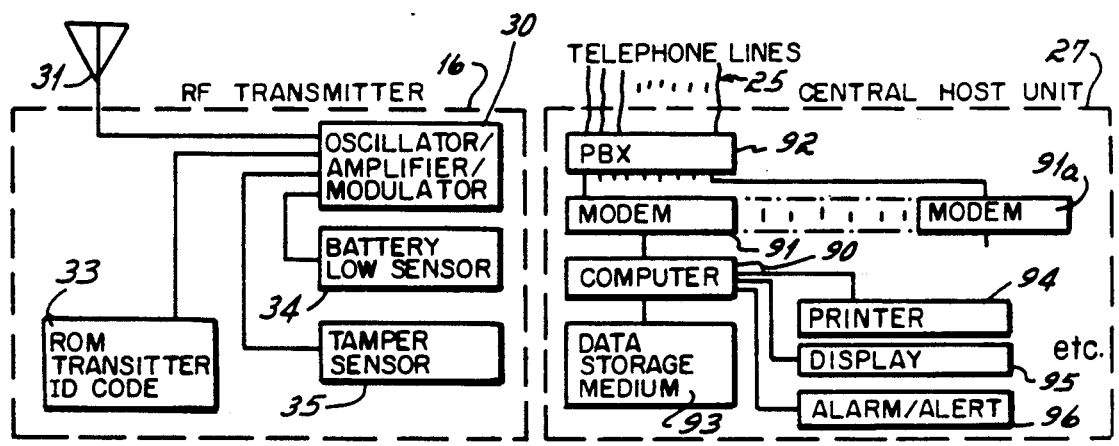
FIG. 2 is a block diagram of an RF transmitter of the anklet type connectable to a prisoner assigned to a particular remote location of the system of FIG. 1.
FIG. 4 is a block diagram of a central or host unit of a remote confinement system of FIG. 1.

Referring to FIG. 2, an RF transmitter assembly 1 is illustrated in block diagram form. The transmitter 16 includes a UHF oscillator 30 having connected thereto a transmitting antenna 31. The oscillator 30 generates a radio frequency carrier wave in the UHF band which is amplitude modulated to carry a signal containing information regarding the identity of the particular transmitter 16, the status of batteries contained therein to power the transmitter 16 and the tamper status of the band or strap 17 of the anklet 15. A more detailed description of the transmitter 16, the receiver in the HMU 20 for receiving the transmitted signal, the form of the signal, and the processing of the information carried by the signal is contained in the copending and commonly assigned application of Jim McCurdy entitled "Remote Confinement System With Timed Tamper Detection Reset" filed on even date herewith and expressly incorporated herein by reference.

The oscillator 30 is an oscillator amplifier modulator circuit having three sources of information to be modulated onto the carrier signal generated by the oscillator 30 and transmitted from the antenna 31. The sources of information are diagrammatically illustrated as a read only memory 33 which contains a transmitter ID code unique to the transmitter 16. The memory device 33 may be in the form of mechanical switches or other circuitry designed to develop an electrical signal representative of the identification number or code for the transmitter 16. In addition, the transmitter unit 16 includes a battery low sensor 34 which is designed to generate an output signal to communicate to the oscillator 30 in response to an indication that the transmitter batteries (not shown) are low. In addition, a tamper sensor 35 is provided and connected to the above described continuity circuit of the anklet strap 17. This sensor develops a signal which is supplied to the oscillator 30 indicating that a tamper has occurred if the strap 17 is severed. The outputs of the transmitter ID code memory 33, the battery low sensor 34, and the tamper sensor 35 are all connected to inputs of the oscillator amplifier modulator 30.

Figure 3:
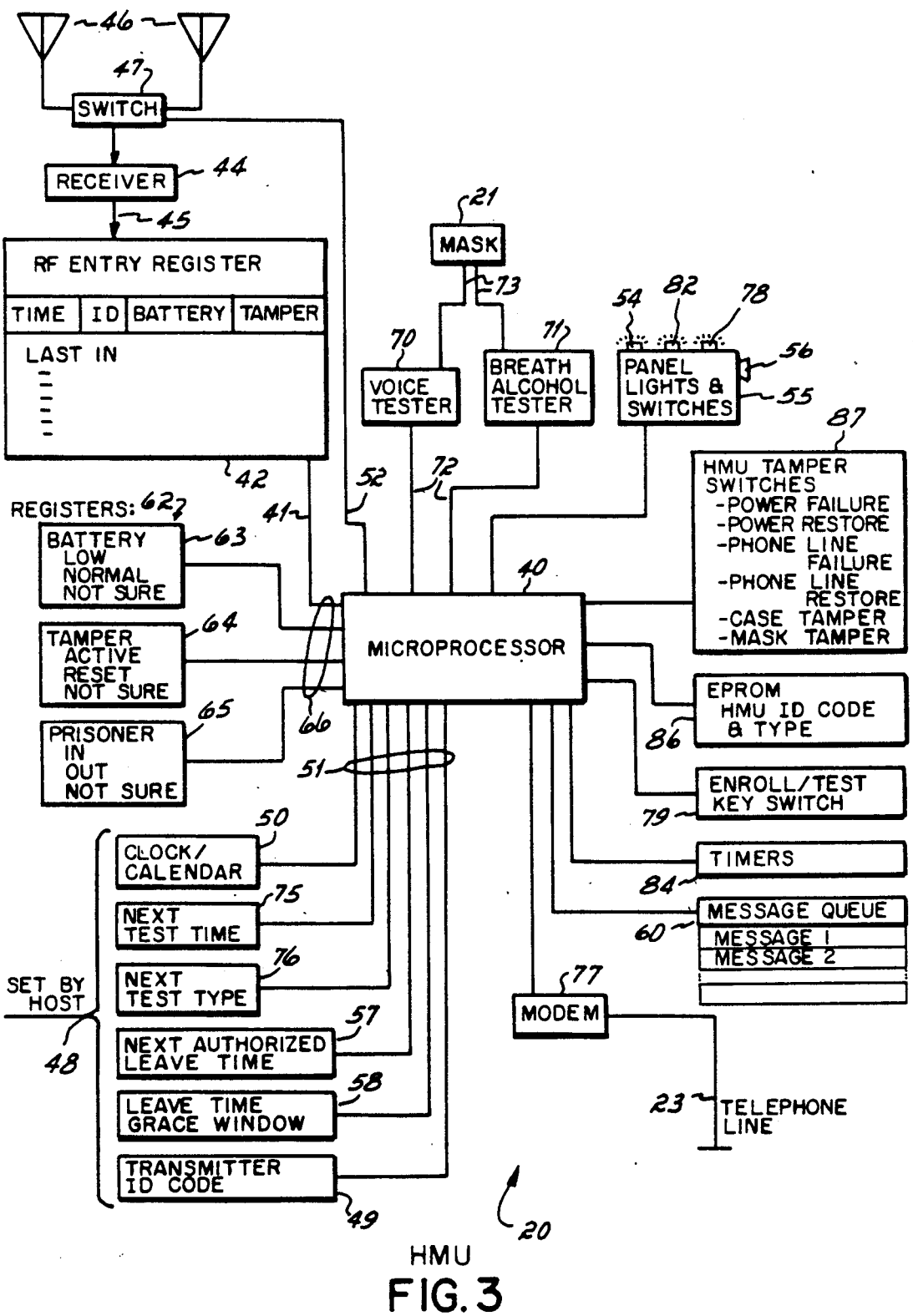
FIG. 3 is a block diagram of a home monitoring unit of a remote confinement system of FIG. 1.

Referring now to FIG. 3, a home monitoring unit (HMU) 20 is diagrammatically illustrated. The HMU 20 includes a microprocessor 40 having a plurality for performing the functions hereinafter described. The microprocessor 40 may be any one of several programmable types, such as the Intel 8088, and equipped with a ROM memory program for controlling its operation as set forth herein. The microprocessor 40 includes an input 41 connected to the output of an RF entry register 42. The register 42 stores in digital form information received by the HMU 20 from the RF transmitter 16 (FIGS. 1 and 2). The HMU 20 also includes a receiver 44 having an output 45 connected to an input of the RF register 42. The receiver 44 is equipped with a pair of receiving antennas 46 connected through a switch 47 to the RF input of the receiver 44. The details and operation of these RF components are set forth in the above identified and incorporated McCurdy application.

The HMU 20 is provided with a set of registers 48 which are loaded with information remotely received from the host unit 27 over the network 14. Included among the host settable registers 48 is a transmitter identification code register 49. The register 49 stores, from information received from the host unit, the ID code which is built into the hardware or ROM device 33 in the transmitter 16 (FIG. 2). The microprocessor 40 causes a check of the code received in the incoming signal in order to determine whether the transmitter signal is indeed a signal from the proper transmitter which is attached to the specified prisoner 13. If the signal received is not a valid signal from the correct transmitter as identified in register 49, an entry signal or presence signal will not be recorded in the RF entry register 42. The registers 48 further include a clock/calendar 50 which is synchronized intermittently to the day and time as signalled by host 27.

The clock calendar 50 in the HMU 20 generates an output signal on one of the input lines 51 which are connected to the microprocessor 40. The clock 50 keeps track of the day and time and provides that information to the microprocessor 40. The day and time information is communicated to the RF entry register 42 through the line 41 in order to mark each of the data entries entered into the register 42 from the output 45 of the receiver 44. Accordingly, the RF information stored in the RF entry register 42 will be stored in a plurality of records, each containing the day and time from the clock calendar 5 at which the RF signal was received, and a digitized representation of the transmitter ID number, the battery status, and the tamper indication.

The antenna switch 47 is controlled by an output signal on line 52 from the microprocessor 40 to the switch 47. The transmitter (FIGS. 1 and 2) is designed to transmit a signal in the form of a brief pulse train every 16 seconds. Unless a signal is received and placed into the RF entry register 42 within 16 seconds of the previously received signal, the microprocessor 40 responds to the absence of an incoming RF signal and cause the switch 47 to switch the antennas 46 by the concept known as diversity switching. Thus, should the transmitter 16 be in a region blind to one of the antennas 46, the switching of the antennas reduces the likelihood that the next successive signal will also be lost.

The RF monitoring is programmed by the microprocessor 40 to operate to look for the receipt of a recognizable incoming RF signal from the transmitter 16. When a signal is received, it is analyzed to determine whether it carries information in a preamble portion indicating that it is a valid signal from a transmitter of the type used on the system 10. It it is, and if the other fields of expected information are present, the decoded transmitter 10, battery and tamper fields are then placed into the RF entry register 42.

A red "out-of-range" indicator light 54 on the HMU panel 55 which lights whenever an expected RF signal is not received within the 16 second time period. In addition, an enunciator 56 is provided on the panel 55 which will sound within two minutes of a missed signal. The HMU sounds a siren tone through the audio enunciator 56 on the panel for a duration of one minute or until an in range RF signal is received from the transmitter 16, whichever occurs first. The purpose of the siren tone is to alert the prisoner 13 to come back within range in the event that he strays to a dead spot in the vicinity of the remote location 11 such as would occur if he were to place his transmitter 16 in water or move it into a shielded region such as adjacent metallic structures at the remote location 11. Then, after an additional two minutes, or a total of five minutes from the time the transmitter 16 first appeared out of range, if an incoming signal still is not received, the prisoner 13 is assumed to be missing and to have departed from the location 11. The time of departure is then assumed to be the time which appeared on the clock 50 when the signal from the transmitter was first missed. In the manner which will be explained below, if this departure is within an authorized departure time, the procedure will still be performed but the sounding of the one minute siren will be suppressed.

The registers 48 which are set with the information from the host unit 27 at the time of each communication also include two registers, 57 and 58, which record the next authorized leave time, register 57, and the leave time grace period window, register 58. The next authorized leave time is the next time after receipt of a signal upon communication with the host unit 27 at which the prisoner 13 is authorized to leave the remote location 11. To avoid annoying other than the prisoner 13, if the prisoner 13 leaves at a scheduled leave time, the enunciator 56 does not sound. The information stored in the leave time grace window register 58 is the time period before and after the authorized leave time during which the prisoner may leave with authorization. This time window, for example, extends 10 minutes before and after the authorized leave time.

A message queue 60 is provided in the HMU 20. The queue 60 is a memory location to which are posted or stored messages for transmission to the central unit 27. Stored in the queue are the "departure" or other messages generated and the time of the departure or other event to be reported. This memory, as with the registers 48, is volatile, but the power supply (not shown) of the HMU 20 includes alternative a.c. and battery power to prevent loss of information for extended periods o time.

The HMU 20 also includes a set of volatile registers 62 which are set by the microprocessor 40 when messages are posted in the queue 60 which relate to the status of the signal received from the transmitter 16. The registers 62 include a battery status register 63 having three states: a "battery low" state, a "battery normal" state, and a "battery not sure" state. The "battery low" state of the register 63 means that the last reported status of the battery low signal from the RF transmitter 16 indicated that the battery low sensor 34 (FIG. 2) in the transmitter 16 was activated. The status of register 63 in the "battery low" state indicates that the last signal reported to the message queue 60 was a signal reporting receipt of a "battery low" indication message. A "battery normal" status in the register 63 indicates that the last signal so posted was a "battery normal" signal to message queue 60. A "battery not sure" state is a state which occurs when no previous message has been posted since the unit 20 has been started up.

The purpose of the registers 62 is to avoid the repeated posting of the same message when no change in status has occurred. It will be assumed that unless the status of the battery changes, then the last posted message which will be received by the host unit in a manner explained below will be looked to for the status of the battery.

Registers 64 and 65 serve a similar purpose. The register 64 is a tamper register which records the last message reported concerning the status of the portion of the signal generated by the tamper sensor 35 in the transmitter 16. The register 64 includes a "tamper active" state which indicates that the last message posted in the queue 60 was that of the tampering with the anklet band 17 being detected. The register 64 also has a "tamper reset" status indicating that the last message posted in the queue reflected that the anklet band had been placed in secure condition. As with register 63, the register 64 possesses a "tamper not sure" state. The details and operation of the tamper detection and reset features are set forth in the above incorporated McCurdy application.

Similarly, register 65 indicates status of the last message reported to the queue 60 concerning the presence or absence of the prisoner 13 at the remote location 11. Accordingly, the register 65 has a "prisoner in" state, a "prisoner out" state, and a "prisoner presence unsure" state. With the example given above, when the departure message had been posted to the queue 60, the prisoner in/out register 65 will have been set to the "prisoner out" status. Thus, further indications that an RF signal is not received will not result in a further posting of a "departure" message until an "arrival" message has been posted.

The HMU 20 is further provided with a voice tester 70 and a breath tester 71. The testers 70 and 71 each include a circuit board in the HMU 20 to provide certain functions. The testers 70 and 71 connect through input and output control lines 72 with the microprocessor 40 and also through lines 73 with the mask 21.

The mask 21 is a sensor head as described in the U.S. patent application Ser. No. 109,815 which has been incorporated herein by reference. It includes a proximity detector, preferably an infrared proximity detector which detects the proper positioning of the mask 21 on the face of the prisoner 13 or other user of the device. It also includes a voice sampling transducer which will generate a signal carrying a voice sample delivered by the user of the mask 21 into the mask. It also contains pressure switches and an alcohol sensor which will generate signals representing the presence of a sufficient pressure on the alcohol sampling head to indicate a proper breath sample is in the process of being delivered as well as that alcohol content sensor which generates a signal proportional to the breath alcohol content of the sample.

The test of alcohol and breath testing are initiated by a clock generated interrupt signal indicating that the time has come for a scheduled test. The signal to start a test is communicated to the prisoner at fixed or random times assigned by the host unit at the tie of the last communication. The time of the next test from such a host generated signal is stored in a register 75 which is the next test time scheduled. In addition, into a register 76 is stored the type of the next scheduled test. The type of the next scheduled test may be, according to the illustrated embodiment, one of four scheduled tests. The scheduled test may be either a voice test, a breath alcohol test which according to the preferred embodiment of the invention includes and is proceeded by a voice test. The test may also be a hello message transmission which is merely a report by the home monitoring unit 20 to the host of the status of the home unit 20 and a request for information to reload the registers 48. The test may also have a location verify message which places a modem 77 on line to receive a telephone communication message from the host unit.

The voice and alcohol tests are preferably scheduled by the host unit 27 at random or programmed times at from one half to 2½ hour intervals, except during sleep time and time when the prisoner is authorized to be away from the remote location 11. The hello test and the location verify tests are performed by the hardware alone and do not involve the presence or cooperation of the prisoner and are performed anytime. The scheduled tests have priority over other tests. However, as will be seen from the flowcharts described below, because the routines are interrupt driven and run independently, the RF test and the tamper tests will proceed on their own schedules while the scheduled tests are being performed. A green "ready" pushbutton light is provided on the panel 55 for the user to interact with the programmed control to start the test.

On the panel 55 is a yellow indicator light 78 which illuminates whenever a call is being placed on a telephone line.

Provision is made at the HMU 20 for an enrollment procedure and a test procedure which can be performed only with the presence of an authorized operator who will initiate the procedures with a special key to activate a switch 79 on the HMU console. The various timing intervals employed by the microprocessor 20 and the various other circuits within the HMU 20 are represented by timers 84 which provide precise timing of the routines. The HMU further includes an EPROM 86 which contains the identification code for the HMU unit 20. This EPROM 86, the timers 84 and the switch are connected to inputs of the microprocessor 40.

The HMU is further provided with a series of detectors which activate various tamper switches 87. This switches 87 respond to electrical changes in certain parameters of the HMU 20 in order to generate signals for detecting power failure, restoration of failed power, phone line disconnect, phone line restoration, case tampering such as would be representative of the prisoner attempting to open the case of the HMU 20, or a mask tamper which would indicate removal of the mask 21 from the unit 20. Each of these conditions generates a separate error signal to the microprocessor 40 which causes the posting of a corresponding message to the message queue 60.

The circuitry for and operation of the breath alcohol tester 71 may be of any commercially available type adapted to the features explained herein, but is preferably of the type disclosed in copending and commonly assigned patent application Ser. No. 209,091, filed June 17, 1988 and entitled "Sobriety Interlock With Bypass Detection", which is hereby expressly incorporated in this application by reference. It discloses primarily a breath alcohol tester for use in a sobriety interlock for a vehicle or a machine and accordingly, the portions disclosed therein in FIGS. 3, 7, 10 and 11 may be omitted. The sampling head and mask circuit shown in FIG. 9 of the incorporated application Ser. No. 209,091 is preferably replaced by that disclosed in the copending and commonly assigned U.S. patent application Ser. No. 109,815, filed Oct. 16, 1987 and entitled "Breath Alcohol Testing System" which is also expressly incorporated herein by reference.

Referring to FIG. 4, the central host unit 27 is illustrated diagrammatically. Unit 27 includes at least one computer preferably of the type having an Intel 80286 or 80386 microprocessor or one of equivalent capability connected through a modem 91 through the telephone lines 25. Optionally, a PBX system 92 may be provided to form a connection between the telephone lines 25 and anyone of a plurality of modems 91 or 91a for connection to different computers. In such a manner, the PBX system may route calls from different HMU's 20 at different remote locations 11 by group to different computers. This would be achieved by assigning different telephone calling numbers to the HMU's in order to place the telephone call to the central unit.

Each of the computers 90 would have associated therewith a data storage medium 93 containing information on the various prisoners information for transmission to the HMU in order to load its registers in replying to host calls from the remote unit. The data storage medium which may be hard disk would store information received and processed over the phone lines for the preparation of future reports to probation office customers. The computer also has connected thereto appropriate printer 94, a display or monitor terminal 95, and an enunciator 96 which may set an alarm, give an audio indication to the supervising personnel that a particular violation has occurred, or otherwise send commands to equipment to inform supervising personnel that action is to be taken.

For example, when a signal is received that a prisoner 13 has departed from the location 11 without authorization, or that a breath alcohol test has been failed, or that a voice test has been failed, or that an equipment failure to tamper has occurred, follow up action in real time may be required. Accordingly, the alarm alerts the supervising personnel so that the indicated action can be taken. Generally, the primary functions of the central host unit 27 are to issue the commands described above which the HMUs 20 expect to receive relating to the particular prisoner in order to load the various registers 48, to receive and interpret information received in the form of messages from the message queue 60 and transmitted over the phone line 23 from the HMU 20, and to display to the supervisor the messages that are received and to inform the supervisor when immediate action may be called for by the nature of the message received. The remainder of the operations of the system according to the principles of the present invention will be understood by review of the operation of the HMU 20 as illustrated in the flowcharts of FIGS. 5-9C.

Figure 5:
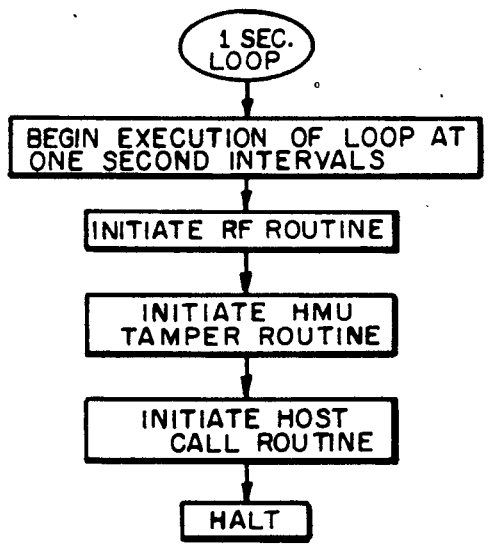
FIG. 5 is a flowchart of the one second interrupt loop of the microprocessor associated with the home monitoring unit of FIG. 3.

Referring to FIG. 5, the main interrupt loop of the microprocessor 40 is illustrated in flowchart form. The loop is triggered by pulses at one second intervals from timer circuitry 84. The triggering of the One Second Loop first initiates the RF routine by generating an interrupt signal to initiate that routine. The RF check routine will be more fully described in connection with FIG. 8. The RF routine has priority over the HMU tamper routine and the host called routine. As will be explained below, the priority of the RF routine is subordinated to that of the scheduled test routine described in connection with FIG. 9 which is initiated by an independent clock signal when the output of clock calendar 50 equals the next scheduled test time stored in register 75.

Returning now to FIG. 5, following the initiation of the RF routine the HMU tamper routine is initiated by an interrupt signal generated by the One Second Loop. The HMU tamper routine merely involves an interrogation by the microprocessor 40 of various hardware switches and interlocks illustrated in connection with the tamper functions 87 in FIG. 3. The One Second Loop then proceeds to initiate the Call Host routine. The Call Host routine is more particularly illustrated in connection with FIG. 6 described below. Thereupon, the One Second Loop routine will halt until the next one second pulse from a timer circuit with an 84 reinitiates the One Second Loop. The priority of the routines is that illustrated by the order in which they appear in FIG. 5. The RF routine has priority over the tamper routine of the HMU which has priority over the Call Host routine. All three of these routines are subordinate to the scheduled test routines as stated above. Each of the four optional routines, however, runs independent of each of the others and all run simultaneously. The priority is maintained by checks within each of the routines to respect the priority assignments when the routines conflict.

Figure 6:
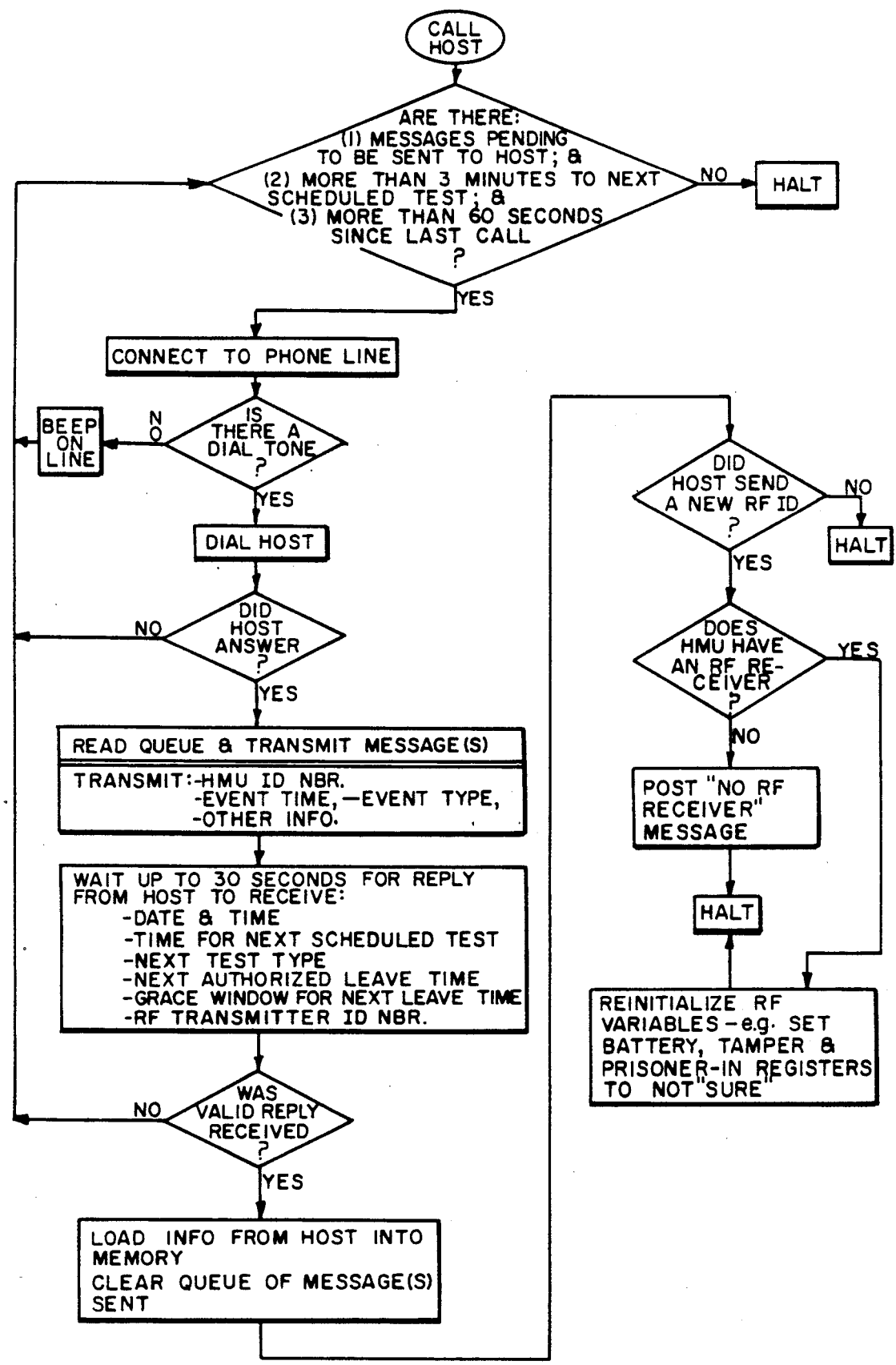
FIG. 6 is a flowchart of the programming of the microprocessor of the home monitoring unit of FIG. 3 and illustrating the program operation of the interrupt driven host calling routine.
Figure 7:
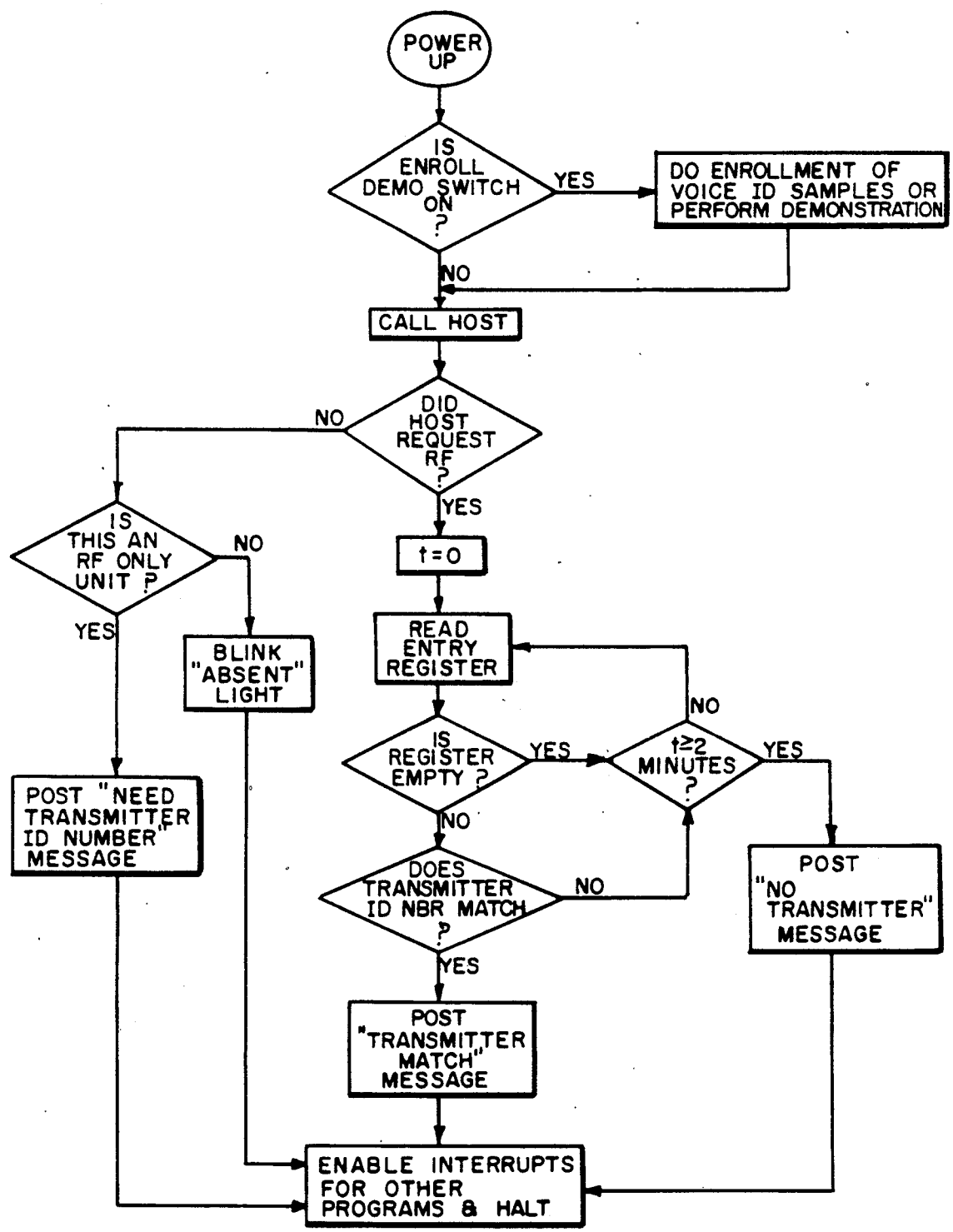
FIG. 7 is a flowchart of the start up routine of the microprocessor of the home monitoring unit of FIG. 3.

Referring to FIG. 6, the Call Host routine is described. When the Call Host routine is initiated by the One Second Loop routine of FIG. 5, a check is made of the message queue 60 to determine whether any messages pending exist to be sent to the host. If so, a message will be sent unless less than three minutes remain to the next scheduled test. This is determined by comparing the clock calendar 50 with the next test time stored in register 75. If that difference is less than three minutes, then the routine will halt waiting for the next scheduled test before a call is initiated. Furthermore, if a fewer than 60 seconds has elapsed since the last call was made, no call will be placed and the unit will halt awaiting at least 60 seconds from the time of the last call before a call will be again made to the host. However, if there are messages on the queue 80, if more than three minutes remains before the next scheduled test, and if more than 60 seconds has elapsed since the last call, connection will be made to the phone line by a signal sent to the modem 77 from the microprocessor 40. When the modem 77 makes the connection to the phone line 23, a check will be made to determined whether a dial tone is present on the phone line 23. If none is present, it is assumed at least by this routine that the line is busy. Then, a beep or tone will be generated on the phone line to inform the person using the phone that the HMU 20 wishes to place a call. The routine will then return to the beginning of the Call Host routine and, as a result, at least 60 seconds will be required to lapse before another call is attempted in which case, unless less than three minutes then remains to the next scheduled test, the reconnection will be made to the phone line.

When, upon connection to the phone line 23, a dial tone is detected, a phone call will be placed to the host by dialing the number stored in either the eprom 86 or the microprocessor 40. Then, the modem 77 will await an answer. If no answer is detected, control returns to the beginning of the Call Host program and 60 seconds will be required before another call may be placed which will proceed according to the logic previously described. If an answer is detected, then the message queue 60 will be read and the message stored therein will be transmitted. The transmission will include the HMU ID number stored in the eprom 86, the event time and event type stored in the message queue 60, and such other information as the system designer may assign. Once this message is transmitted over the phone line 23 to the answering unit, a wait of up to 30 seconds will be made for a reply to be received from the host. If no valid recognizable reply is received within the 30 second interval, control will return to the beginning of the Call Host routine and 60 seconds will be awaited for another call in accordance with the same logic previously described. The failure of the host 27 to reply could indicate a busy condition at the host unit or a defective transmission or some other reason. Regardless of the reason, unless a valid reply is received, the HMU 20 will assume that effective communication was not made with the host unit 27. A valid reply will include date and time information to reset the clock calendar 50, a time for the next scheduled test which will reset the register 75, the type of the next scheduled test which will reset the register 76, the time of the next authorized leave time which will reset the register 57, the leave time grace window which will reset the register 58, and the RF transmitter ID number which will reset the register 49. If any one of these values is inapplicable to the HMU 20 or relate to a test which is not to be used, a code, such as a 99999 will be transmitted by the host 27. Failure to receive information for each variable will be interpreted as an invalid reply and accordingly the call will be placed again subsequently. If a valid reply is received, the registers 50, 75, 76, 57, 58 and 49 will be loaded and the messages transmitted will be cleared from the message queue 60.

There are two ways in which these messages will be transmitted. According to one option, all of the messages in the message queue can be transmitted in a single call. If this is the case, upon there transmission, all of the messages will be cleared. To simplify the HMU system, and to minimize the amount of information which must be received and analyzed by the host unit 27, the transmission may include only one message from the message queue 60 per call which would be sent on a priority system. The priority system may be arranged in accordance with the preferences of the parole customers and this will normally be the reporting of departures from the premises as having the highest priority or the failure of breath or voice test.

Upon completion of the call to the host, additional checks of the incoming data are made. First, it is determined whether or not a new RF ID number for the transmitter 16 was transmitted. If it was not, then no further processing is required and the routine halts. If a new RF ID number was received, the system microprocessor 40 checks to determine the configuration of the system with respect to the provision for RF receiver. If an RF receiver 44 is included with the HMU 20, then the RF variables are reinitialized by a setting of the register 62 to the "not sure" state. The routine then halts. If no RF receiver 44 is present in the HMU 20, then a "no RF receiver" message is posted in the message queue 60. Such a message will be transmitted at the next call.

With the Call Host routine having been described, it is now appropriate to consider the Power Up routine which uses the Call Host routine. The HMU 20, when initially powered, has insufficient information to proceed with the test since all of the registers 48 are empty. Accordingly, the powering up of the unit first causes an interrogation of the Enroll Test Key switch 79 in order to determine whether a test is being run or whether the enrollment of a new prisoner 13 is being made into the voice identification system.

If in the enrollment mode, during the enrollment mode, 3 to 5 words are recorded. This is done by a probation officer requiring the prisoner to utter each of the 5 words three times each. Each of the utterances of a word are recorded in a memory in the voice tester 70 for comparison when a voice test word is uttered. Upon that utterance during the course of the test, each uttered word will be compared with the three utterances of the corresponding word in memory to determine whether or not there is a voice match.

Upon the end of the enrollment mode or if there is no enrollment or demonstrator option selected by the use of the Enrollment Test Key switch 79, then a call is placed to the host in accordance with the procedure previously described in connection with FIG. 6. When the reply from the host is received, it is analyzed according to that procedure described in connection with FIG. 6. The information received is interrogated to determine whether or not RF testing was requested by the transmission of a transmitter ID number. If none was requested, a check is made to determine whether or not the particular HMU unit is an RF Test Only unit. If it is, then, to inform the installer that no function has been requested of which the HMU unit 20 is capable of performing, the "absent" light 54 on the panel 55 is caused to blink. Then, the interrupts are enabled so that other programs may proceed and the routine halts.

If the unit is an RF Only unit then a "need transmitter ID number" message is posted in the message queue 60 to be sent to the host, the interrupts are enabled for the other programs and the routine is halted. If, however, the host did request RF testing by supplying an ID number to the transmitter ID code register 49, then a timer contained in the circuitry 84 is set to zero and the entry register 42 is read for data. If the register is empty, then the register is continuously reread until the timer times out at two minutes or data in the register is found, whichever occurs first.

If the timer times out at two minutes, it implies that no transmitter has been located with the given ID number at the remote location 11. If this is the case, a "no transmitter" message is posted in the queue 60 and the interrupts for the other programs are enabled and the routine halts. When information is found in the entry register 42, and this information matches the ID number transmitted and stored in register 49, a "transmitter match" message is posted in the message queue 60, then interrupts for the other programs are enabled and the routine halts. The HMU is thus in operation under the control of the interrupts described in connection with the description of FIGS. 5 above and FIG. 9 which will hereafter follow.

Figure 8:
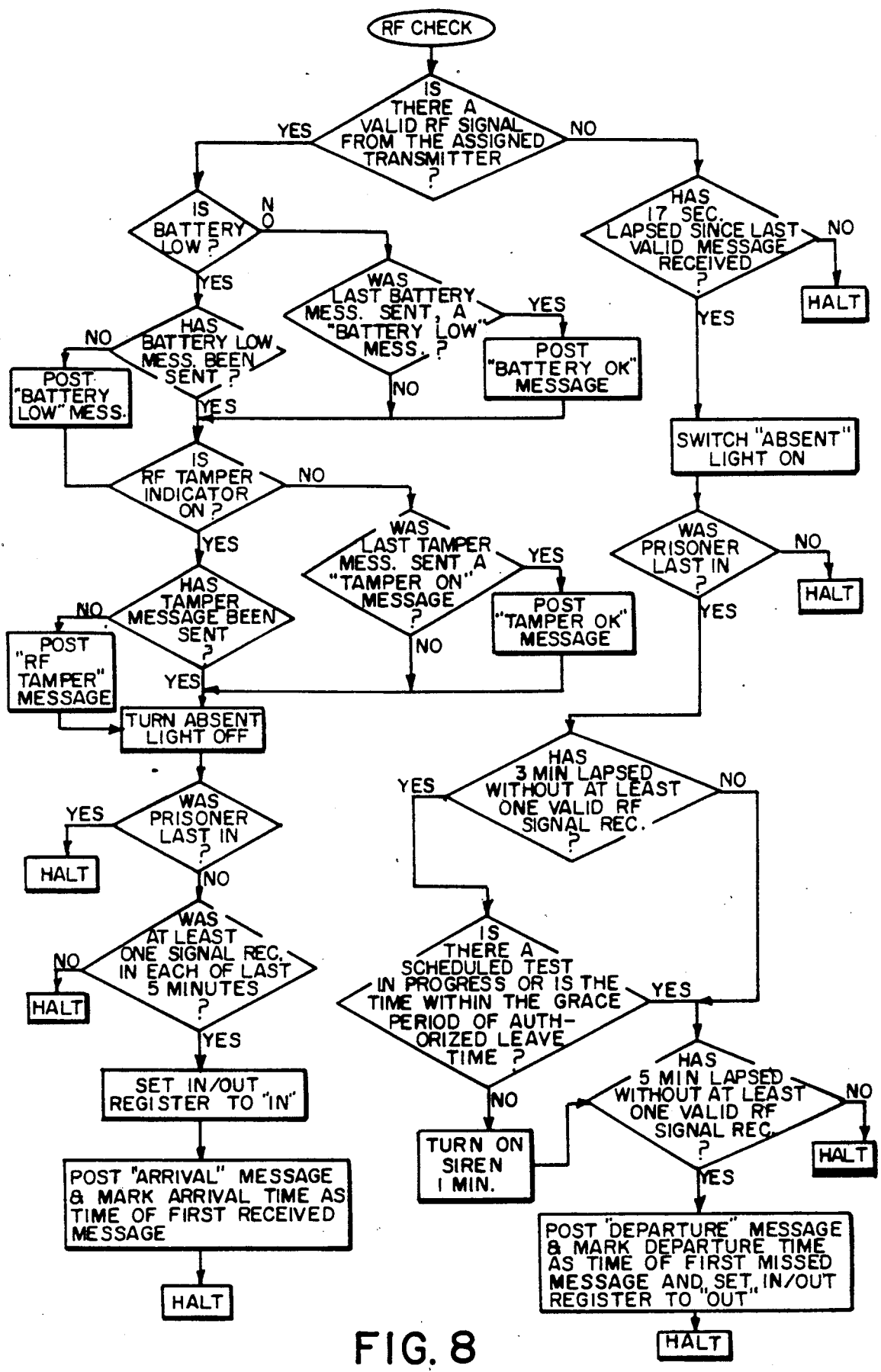
FIG. 8 is a flowchart of the radio frequency checking routine of the microprocessor of the home monitoring unit of FIG. 3.

Next, however, with reference to FIG. 8, the operation of the RF check routine is described. As previously explained, the RF routine is initiated by an interrupt generated by the execution of the One Second Loop described in FIG. 5. It should be appreciated that when a signal is received on one of the antennas 46 and detected by the receiver 44, a preamble is checked to determine whether or not the received signal is a signal from an RF receiver of the type of receiver 16 used with the system 10. If such is the case, an ID number is detected from the received signal, the battery indication status is read from the received signal and the tamper indication is read from the received signal. These items contain the information from the memory 33 in the transmitter 16 (FIG. 2) and the battery and tamper sensors 34 and 35. This information is then stored in the RF entry register 42 together with the time from the clock 50 at which a signal was received.

Upon initiation of the RF check routine of FIG. 8, the last entry received in the entry register 42 is checked to see whether or not it is a valid signal from the assigned transmitter. This is achieved by comparing the number in the ID field of the last entry received, if any, with the content of the register 49. If there is no match, or if there is no entry at all in the register 42, then it is determined by comparing the clock 50 with the time field of the last entry in the register 42 to determine whether 17 seconds has lapsed since the last valid message was received. If it has not, then the routine halts. If the 17 seconds has lapsed, then the result means that the prisoner is possibly absent from the remote location 11 because the signal was not received within the time expected. When this occurs, the "absent" light 54 on the panel 55 illuminates. Then, the status of the in/out register 65 is checked to determine whether or not the prisoner was last reported in at the remote location. If the prisoner was last reported as out or having departed from the remote location 11, then the absence of a signal is consistent with that state of departure and the routine halts. If the prisoner was last in at the remote location 11 then the routine checks to see whether or not three minutes has lapsed without at least one valid RF signal received. This is achieved by checking the time recorded for the last entry posted in the RF entry register with the time in the clock 50. If the three minute time has lapsed then the program checks to determine whether or not there is a scheduled test in progress or whether or not the time is within the grace period of an authorized leave time. If the scheduled test is in progress, or if the prisoner is authorized to leave at the present time, then no siren would be sounded. Otherwise, a siren on the panel will be sounded through the enunciator 56 and will endure for a period of one minute. When the siren has ceased to sound or if three minutes have not lapsed since the last valid test a check is made to determine whether or not five minutes has lapsed without at least one valid signal being received each minute. Then the in/out register 65 is set to "out". If five minutes have not passed no valid signal received, then the routine halts. Otherwise, the departure of the prisoner is presumed and a "departure" message is posted in the message queue 60. It should be appreciated that every time a message is posted in the message queue 60, the time of the posting of the message or the time of the occurrence of the event, if different then the time of the posting of the message, will be recorded in the queue 60 along with the message. In the case of the departure of the prisoner, since five minutes will have elapsed since the departure to be recorded before the message is posted, the time of the first missed message is the time recorded in the message queue 60. When it is recorded, the routine is halted.

The five minute delay in posting the departure message allows for a temporary loss of signal to pass without the signalling of a departure to the central unit. Accordingly, if a valid signal were to be received at a time during the five minutes, this portion of the flowchart would not be reentered before the lapse of the five minutes and accordingly no departure message would be sent. The provision for the siren of one minute serves the important function of informing the prisoner that his signal has not been received by the HMU's receiver 44. Thus, the prisoner will know that he has positioned himself such that the transmitter 16 is not generating a sufficiently strong signal to be detected by the receiver 44 and thus he has the opportunity to move back into range or to reposition himself to prevent a posting of the message of his departure when he has not in fact departed from the remote location 11.

Returning to the top of the flowchart of FIG. 8, had there been a valid signal from the transmitter detected upon the entry of the RF check the left branch of the flowchart will be processed. It should be noted that the RF check will, under the control of interrupts generated by the One Second Loop of FIG. 5, occur at each one second interval. Thus, each entry of the RF check flowchart by way of a halt routine, as for example has been explained in connection with the branches on the right of the flowchart which are processed when no signal is received, will result in a check of a signal every second. Thus, unless and until each of the 17 second, three minute and five minute time periods has lapsed and has been repeatedly checked every second for such periods of time, then control will proceed along the left branch of the flowchart of FIG. 8.

When a signal is received which is valid, then the battery status information from the entry register 42 is checked. If the battery is low the the status of register 63 is checked to see whether the last report to the message queue was of a low battery indication. If not, then a "battery low" message will be posted in the message queue 60. If such a message were previously posted, then the portion of the field of the last entry in the entry register 42 relating to the status of the tamper indicator is tested. If, on the other hand, the check of the queue 60 had determined that the battery was not low, then the register 63 is checked to determine whether a "battery low" message was last sent and, if it were, then a "battery OK" message is instead posted to the queue 60.

In all cases, after the checking of the battery status portion of the entry register 42 and the posting of either a "battery low" or "battery OK" message, the RF tamper indicator is checked in a similar manner. If the message indicates a tamper and a previous tamper message has been sent or if the tamper indicator field of the RF entry register indicates "no tamper" and a "tamper OK" message had been previously sent, then the absent light 54 is turned off. If a tamper is indicated by the status of the RF entry register 42 and the "RF tamper" message has not been the last message sent, then a "RF tamper" message is posted in the queue 60 and the absent light 54 is turned off. If the tamper indicator was not on but the last message sent was an RF tamper message as indicated by the on status of the register 64, then a "tamper OK" message is posted and the absent light is turned off.

Following the turning off of the absent light 54, a test is made of the content of the prisoner in/out register 65 to determine whether or not the prisoner was last reported in. If the prisoner was reported in, then the routine halts. If the prisoner was reported out, however, then the register 65 is checked to determine whether or not at least one signal was received within each of the last five minutes. If at least one signal was not received within each of the last five minutes, then the program halts. If, however, at least one signal was received in each of the last five minutes, then a valid confirmation of the entry of the prisoner back onto the premises at the remote location 11 will have been verified and the in/out register 65 will be set to "in". Then, an "arrival" message will be posted to the message queue 60 and its time will be marked as the time of the first received RF signal in the message queue 42. Thereupon the routine will halt.

Figure 9:
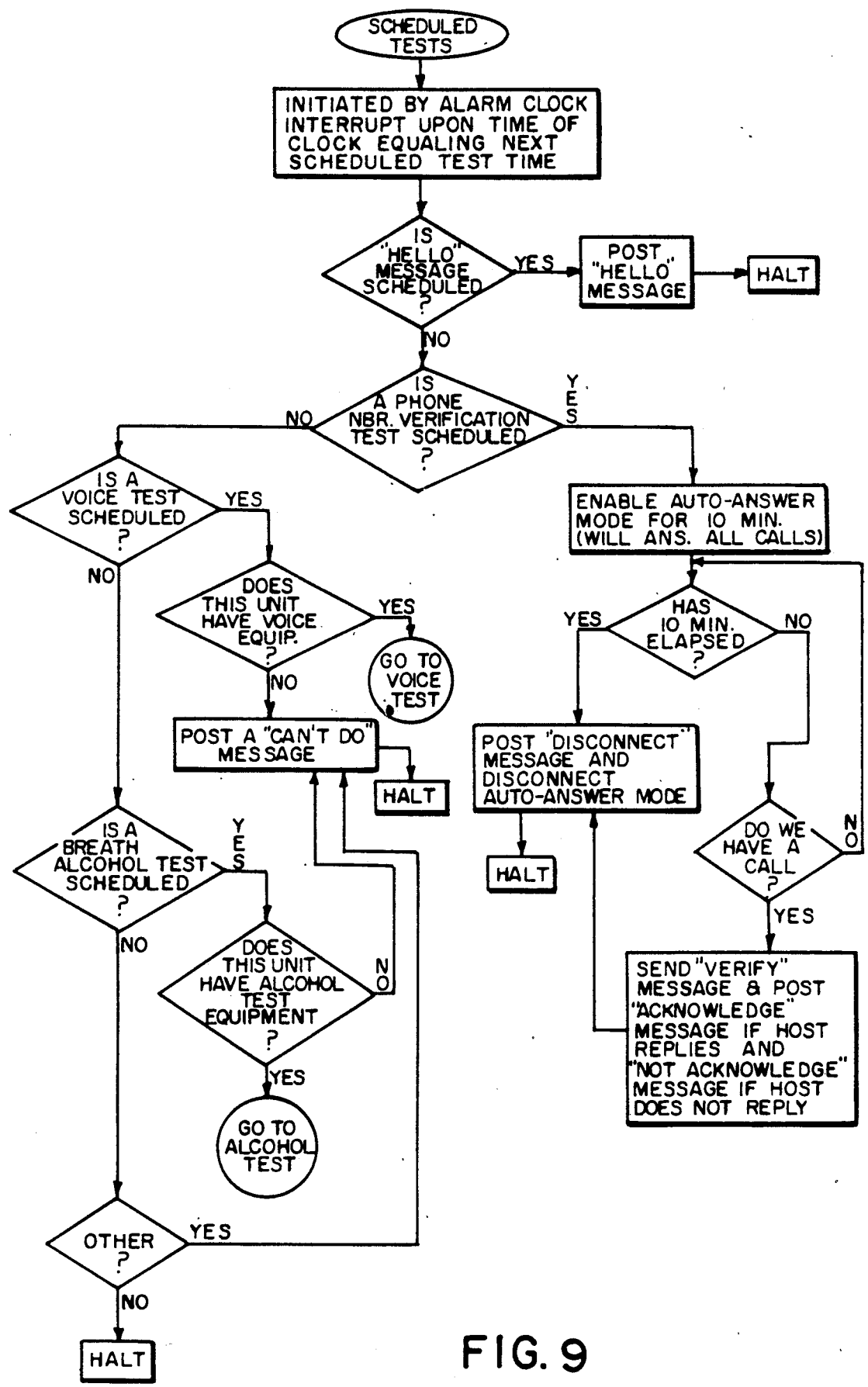
FIG. 9 is a flowchart of the scheduled test performing and initiating routine of the home monitoring unit of FIG. 3.

Proceeding next to the scheduled test routine of FIG. 9, as previously indicated, the scheduled test routines are initiated by independent interrupts upon the time of the clock 50 equalling the time of the next scheduled test recorded in register 75. When a next scheduled test time arrives, the register 76 is interrogated to determine the type of test which is scheduled. If the test is a "hello" message to be reported, a hello message is posted in the message queue 60 and the routine halts. A Hello message is the simplest form of message which merely is designed to inform the host unit that the HMU 20 is active and to seek a reply from the host unit 27 to update the contents of the registers 48 to accept commands for the next test.

If the current message is not a Hello message, then the status of register 76 is checked to determine whether or not it is a phone number verification test which is scheduled. A phone number verification test allows the host unit 27 to dial the HMU 20 in order to insure that the unit is connected to the proper telephone line. In that the HMU 20 is not normally permanently connected to the telephone line 23, since such connection would permanently dedicate the telephone line to the HMU 20, it is necessary that an auto answer mode be enabled in the modem 77 for it to answer a verification call from the host 27. Accordingly, if a phone number verification test is the type of test which has been scheduled according to the information in register 76, then the modem 77 will be so enabled and will be enabled for a period of, for example, 10 minutes. Since the host unit 27 will know the time it specified for a phone number verification test, it will then, if operating properly and not otherwise preoccupied, dial the phone number of the line 25 to which the HMU is connected to determine whether or not the modem 77 answers.

If, after the modem is activated, 10 minutes has elapsed and no call is received, then a disconnect message is posted in the message queue and the modem 77 is disconnected from auto answer mode and the routine halts. If 10 minutes has not elapsed, then the phone line 23 is monitored to determined whether or not an incoming call is appearing on the line 23. If not, the routine will cycle until the 10 minutes has lapsed.

If an incoming call does come in during the time, then a "verify" message is sent and a "acknowledge" message is posted to the queue if in response to the verified message the host has replied. If in response to the verify message the host has not replied then a "no acknowledge" message is posted to the message queue 60. Then, a disconnect message is posted to the message queue and the auto answer mode of the modem is disconnected. Thereupon the routine halts.

Figure 9A:
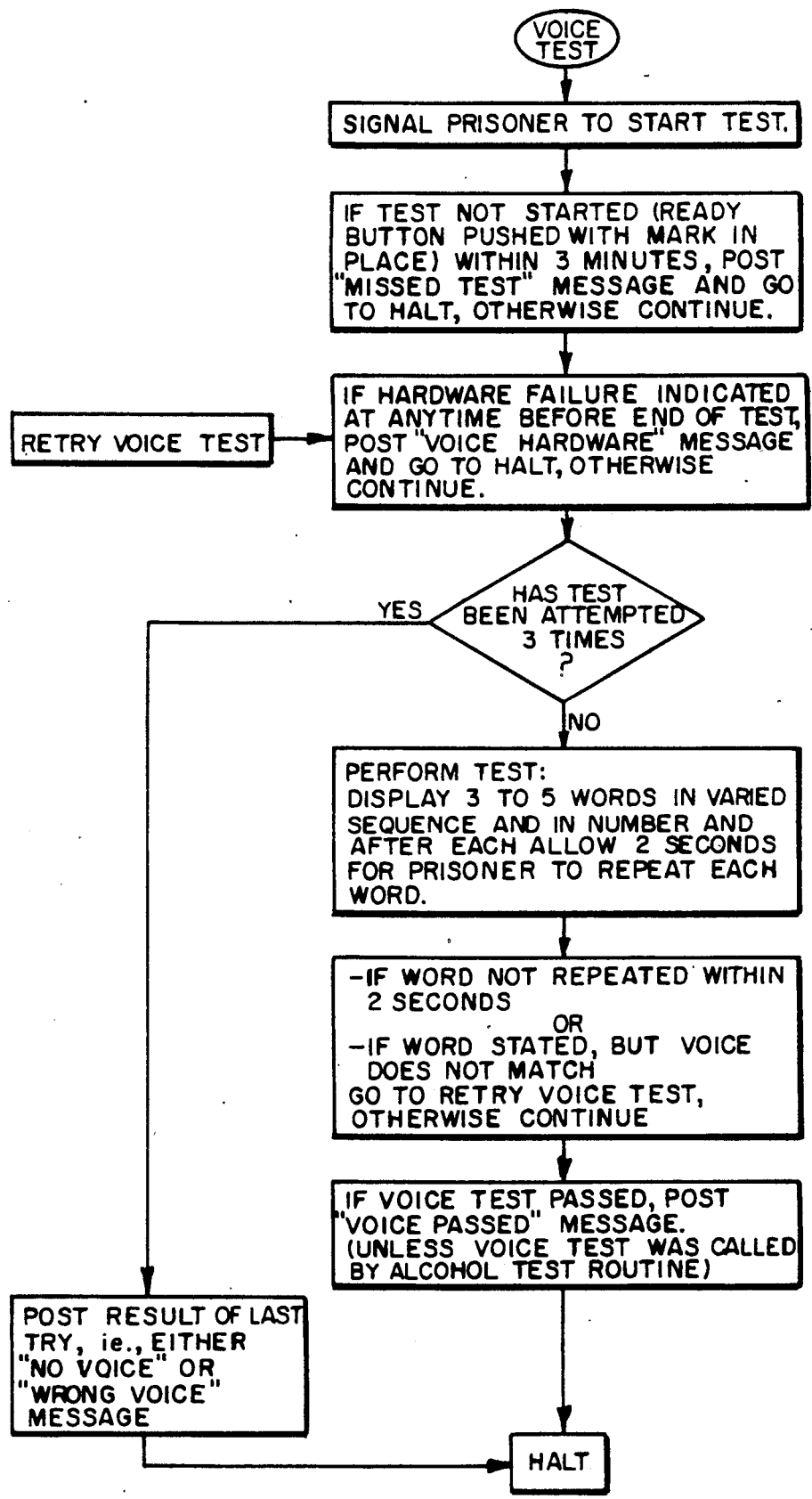
FIG. 9A is a flowchart of the voice test routine called in FIG. 9.

If a phone number verification test is not the scheduled test then the routine proceeds to determine whether or not it is voice test or an alcohol test which is being scheduled. If it is a voice test which is being scheduled, then the microprocessor 40 checks the hardware configuration to determine whether the unit does have voice equipment in the form of a voice tester 70. If it is present, then the voice test routine described in connection with FIG. 9A is executed. If the unit does not have a voice tester 70, then a "can't do" message is posted and the machine halts.

If a voice test is not the scheduled test, then a check is made to determine whether or not it is the alcohol test which was scheduled. If it was not, then it checks to determine whether or not some other test is requested and if so, since no other equipment is provided in the embodiment illustrated, a "can't do" message is similarly posted and the routine halts. If no other test is indicated upon interrogation of the next test type register 76, then the routine halts.

However, should the alcohol test be the test scheduled, then the routine checks to determine whether or not the alcohol test equipment 71 is provided with the current HMU 20. If it is not, then again, the "can't do" message is posted and the routine halts. Otherwise, if the equipment is present, then the alcohol test as described in connection with FIG. 9B below is executed.

Figure 9B:
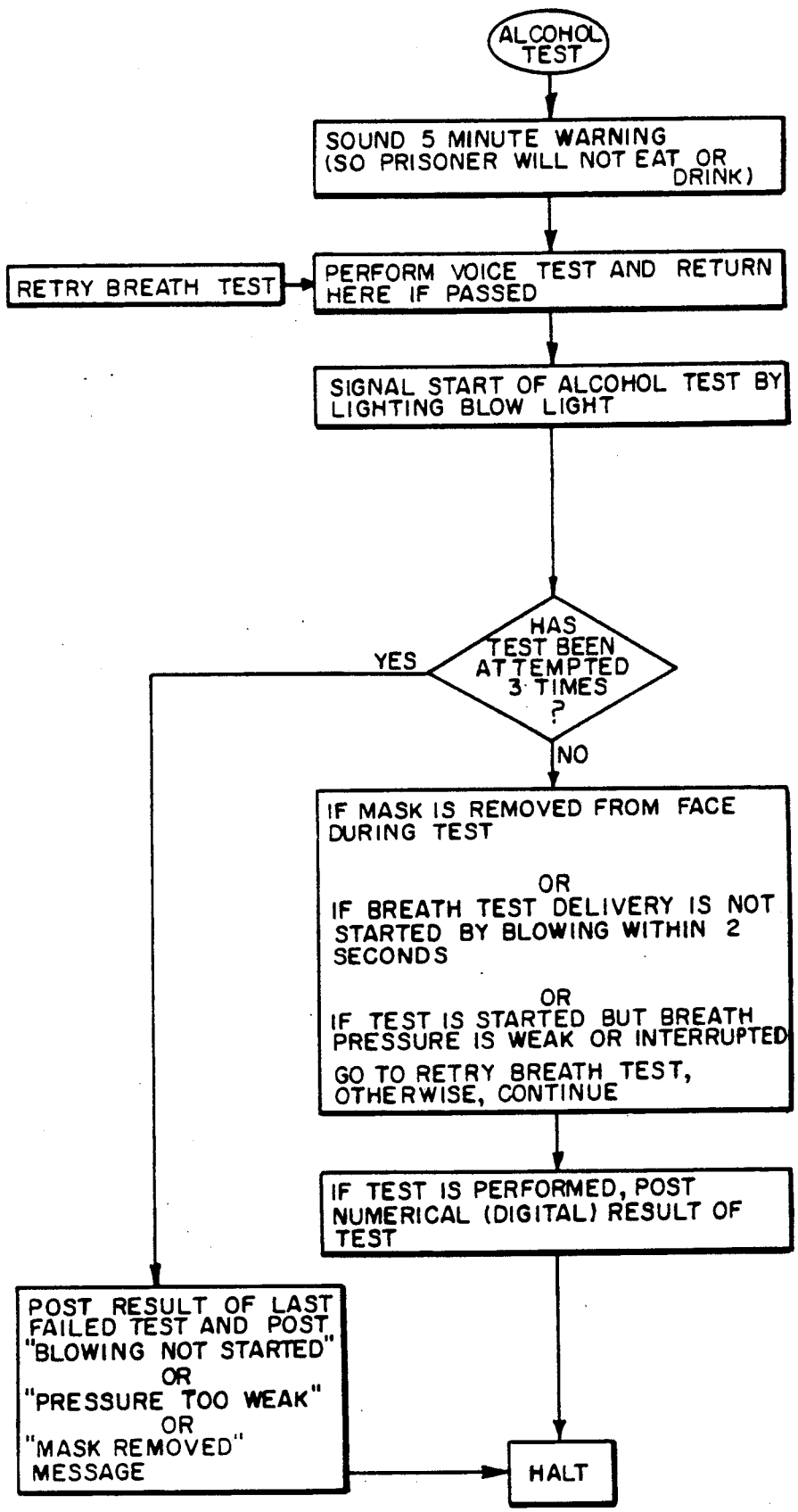
FIG. 9B is a flowchart of the alcohol test routine called in FIG. 9.

Referring to FIGS. 9A and 9B, the operation of the voice and alcohol tests is explained. When the next scheduled test type set in the register 76 indicates a breath alcohol test, a voice and breath test will be both performed. The voice test will proceed the alcohol test in such a way that the identity of the person delivering the breath sample for the breath test will be confirmed as that of the specified prisoner before a test proceeds. When the scheduled test time set in register 75 for the breath alcohol test arrives, an interrupt is initiated which triggers the voice and breath alcohol testing hardware to execute the test. As a first step, a signal is output on the enunciator 56 to warn the prisoner that he will be required to take a test within five minutes. This five minute period allows the prisoner to refrain from eating, drinking or smoking until the test is completed and not doing so within the five minute period proceeding a breath alcohol test can cause false test readings. Along with the sounding of the enunciator 56, a green ready button 78 is illuminated on the panel 55. When the signal sounds on the enunciator 56 and the green ready button 78 illuminates, a prisoner is given three minutes to press the button to indicate readiness. If he does so, five minutes is allowed for commencement of the test when again the green ready button will be illuminated and a sound similar to a telephone ring will be output on the enunciator 56. If the prisoner does not push the ready button that he is available within about three minutes of the first alert, a missed test message will be posted in the message queue 60. When the second signal is sounded for the prisoner to begin a test, a further three minutes is allowed for pressing of the ready button. If the button is not pressed, again a missed test message is posted in the queue 60. The pressing of the ready button at this time must occur when the mask 21 is properly placed on the face of the person taking the test. Unless the presence detector within the mask indicates a proper positioning of the mask, and in addition that the background noise is low enough to allow an accurate test, the test will not proceed upon the pressing of the ready button.

When the ready button is pressed, the system proceeds with a voice test to verify the identification of the prisoner. Upon enrollment of the prisoner on the system, voice samples were stored in memory within the voice tester 70 recording the utterance of 3 to 5 words 3 times each. When the voice test is performed, after the ready button has been pressed and the mask has been properly positioned, the HMU 20 will prompt the prisoner to repeat one of the words by displaying the word on a panel display (not shown) or sounding the word on the enunciator 56. The prompt is followed by a sounding a beep through the enunciator 56. After each word is prompted and the beep is sounded, the prisoner must repeat the word within a specified time, say two seconds. A prisoner is given three tries to repeat the word within the prescribed time and to have the word match the voice sample of the word stored in the voice tester memory. These three words will be prompted in random order and accurate matching of all three words on at least one of the three tries will be required before the test is passed. In addition, a random bogus word may be included in the sequence to foil an attempt by the prisoner to use recorded words instead of his own voice. The bogus words will not be analyzed.

If the test is passed with a matched voice sample uttered by the prisoner in response to prompts of the recorded words, a green ready light illuminates signalling for the prisoner to deliver the breath sample. If the words do not match the stored data, the HMU will flash an error indicator and start the test over. If the test is failed three times, a "voice test failed" message will be posted in the queue 60. If the test is passed, the prisoner must begin blowing the breath sample immediately when the green ready button is illuminated and must sustain a breath sample for a continuous 4½ seconds without interruption. When the beginning of the delivery of the breath sample is detected by the breath tester 71, a humming tone will be produced and sustained for the full 4½ second interval so that the prisoner knows how long to continue delivering the sample. The prisoner will be given three tries to deliver an acceptable breath sample of the proper pressure for the full 4½ second duration.

When an acceptable test is delivered, the breath alcohol content of the person will be recorded whether 0 or at whatever level measured and the message queue 60. If the test fails for any reason other than the reading of an unacceptable alcohol content, that other reason will be recorded and the message posted to the queue 60. Such messages would include a voice mismatch, a failure to blow the breath sample soon enough, failure to blow the breath sample long enough or hard enough, or failure to take the test at all. When the test is completed, the next operation to be observed by the prisoner will be the illumination of the yellow telephone indicator light 82 on the panel 55. This light will illuminate whenever a message is being transmitted to the host unit.

The voice tester 70 operates in part under the control of the microprocessor 40, the circuitry of the voice and alcohol testing devices incorporated by reference from U.S. patent applications Ser. Nos. 109,815 and 209,091, and a voice analyzer board manufactured by Ecco Industries, Inc., 130 Carter Street, Danvers, Mass. 01923. The board operates in accordance with the procedure set forth in the flowchart of FIG. C.

Referring to FIG. C, the operation of the voice analyzer board of the voice tester 70 interacts with the other components of the HMU 20 to perform the following functions. A digital word prompt output which is set each time the voice tester 70 prompts the user to say a word. The voice tester 70 generates a synthesized voice from stored data plus a beep to prompt the user to say the word. Stored data is programmed by the user saying the test words during enrollment. Up to 5 test words are provided for. These words are not permanently stored in voice tester 70 but are determined at time of enrollment from a list of words selected for proper operation. Test words are prompted in an unpredictable order generated by a pseudo-random algorithm. The voice tester generates at least one word prompt after sufficient samples have been received to make a decision. The voice tester 70 may generate additional bogus word prompts.

The voice tester 70 sets an accept output to indicate that the person saying the words is the same person at the one enrolled since the voice characteristics match. The tester 70 sets a reject output to indicate that the person saying the words is not the same person as the one enrolled since the voice characteristics do not match. A time-out output is set to indicate that the person being tested did not respond to the prompt by saying the words within the time-out interval. The user is given two opportunities to say each word in each try. After a time-out limit has been exceeded the first time, the user is given a second prompt to say the same word. After the second failure to supply a word, the time-out output is set and the test try is ended.

A test mode is also provided. In this mode, the setting a self-test output will indicate that the system has performed diagnostics and has been found to be functional and is ready to analyze words. If enrollment has not been completed or if enrollment data is lost, the self-test output will not be set. In the enroll mode, self-test will be set regardless of lacking or unsatisfactory enrollment data, if all other conditions are satisfactory. The tester 70 has two manually selectable modes: a test mode and an enrollment mode.

The voice verification module or board of the tester 70 has, as one of its purposes to verify the identity of a user taking an unsupervised breath alcohol test in order to prevent a breath sample being supplied by some other person. It is also used in a home confinement system without alcohol testing capability. The voice tester 70 prompts the user to say certain predetermined words and compares the characteristics of the user's voice against stored data to determine if it is the correct person taking the voice test. The results of the voice comparison will be used to verify that the user is where he is supposed to be and to determine if the user will be allowed to take the breath test. The voice tester 70 interfaces with a microprocessor controller 40 which controls the overall process of voice verification and alcohol testing.

If the HMU 20 is operating from back-up power supplied by a battery, the voice tester 70 will not have power supplied except while it is actually performing its function. When outside electrical power is available, the voice tester 70 is powered at all times.

The voice tester 70 has two modes: test and enrollment. Enrollment consists of taking a number of voice samples to be analyzed and storing the results of the analysis for future comparison. During enrollment, the user will be under the supervision of a trained instructor. The same microphone will be used during enrollment and resting and is contained within the mask 21. If a microphone is replaced, it will be standard procedure to repeat the enrollment.

Figure 9C:
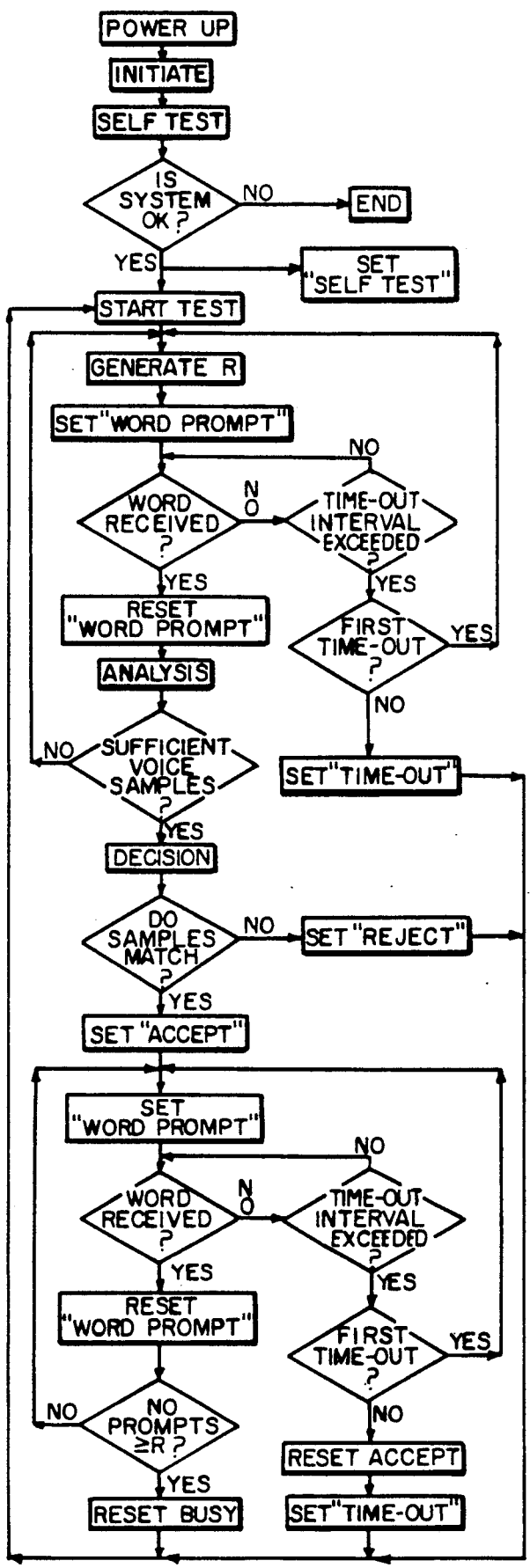
FIG. 9C is a flowchart of the portion of the voice test operation performed by the voice test routine called in the test procedure referred to in FIG. 9.

The sequence is shown as a flow chart in FIG. 9C. As shown in FIG. 9C, power is applied to analyzer board. Between tests, the analyzer board may be powered or power may be shut down. To initiate the power up procedure, the controller 40 generates a pulse at a reset input. The tester 70 then performs tests to verify its software and hardware and will do the initial processing to be ready for analyzing words. At the end of the test and initialization, the self-test output signal level activates. If it does not within a specified self-test time interval, it will be considered that a malfunction has occurred. While in the test mode, the self-test output does not activate unless complete and satisfactory enrollment data is stored. After the self-test output is set, a pulse or interrupt signal is applied to the start test input of the voice tester, and this pulse lasts until the first word prompt. The time between setting the self-test output and the pulse may be any time from zero to infinity. The tester waits for this pulse from the microprocessor 40 before proceeding.

After receiving the start test pulse, the tester analyzer board generates an audio output to prompt the user to say a randomly selected word. The audio output consists of a play-back of the word as supplied at enrollment time followed by a 100 ms pause and a 100 ms beep. The prompt output will remain set until a word is uttered by the user or until a time-out limit is passed.

The tester board will perform analysis to determine whether there are sufficient voice samples to make an accept or reject decision. If the tester does not have sufficient voice samples, prompt again. This process will be repeated until the tester receives sufficient word samples to make a decision to accept or reject. When and if sufficient voice samples are received by the tester, it signals the result of the test b setting either its accept output or its reject output. If the decision is to reject, the test will end, the tester resets and performs no further processing until it receives a start test or reset pulse from the microprocessor 40.

The tester will generate at least one bogus prompt after receiving sufficient voice samples for an accept or rejection decision. The tester determines whether the speaker supplies a word, but performs no other analysis. If the speaker does not supply a word within a time-out interval, the accept output resets. If the voice sample is not supplied within the time-out interval, the tester will clear the prompt output. If it is the first time that the user was prompted to say the word, the user is given another opportunity to say the same word. If it is the second time that the user has not supplied the word within the time limit, the test will be stopped and the tester sets its time-out output. When this state is reached, the tester does not perform any other functions until it receives a start test or reset pulse from the microprocessor 40.

If a pulse from the microprocessor 40 is applied to the start test input at anytime during a test, the test is aborted and the sequence will return to the start test function and the test will be repeated from the beginning. The tester responds by generating a 100 millisecond abort ack pulse. The test may be aborted and restarted any number of times, without limit, as often as start test pulses are applied. The number of retries per test is set at 3 by the microprocessor 40.

If a start test pulse from the microprocessor 40 is applied after completion of a test, the sequence will go back to the start test position, accept, reject or time-out outputs will be cleared and the test will be repeated.

The test may be repeated any number of times, without limit, as often as the start test pulses are received from the microprocessor 40. If a reset pulse is applied after completion of a test or at any other time, the sequence will go back to the self-test and initialization point, all outputs will be cleared and the entire sequence will be repeated.

What is claimed is:

1. A remote confinement system for monitoring from a central office the presence of a specified prisoner at a remote confinement location at which the specified prisoner is assigned for unsupervised confinement, said system comprising:
   a transmitter having attached thereto means for securing said transmitter to the body of the specified prisoner, said transmitter including means for transmitting a signal carrying characteristic information of the identity of said transmitter;
   a receiver at said remote location for receiving said signal from said transmitter when said prisoner is within proximity to said remote location;
   a processor at said remote location including a storage device for storing a transmitter ID code;
   said processor including means for accepting transmitter identity information from said received signal, means for comparing said received information with a transmitter ID code stored in said storage device, and means for generating an output signal carrying the result of the comparison;
   means for establishing a communications link between said remote location and said central office;
   means for communicating from said central office to said remote location the transmitter ID code corresponding to the characteristic information of the identity of said transmitter; and
   said processor including means for storing said assigned ID code in said storage device.

2. The system of claim 1 wherein:
   said communicating means includes means at said remote location for establishing said communications link in response to certain results of the comparison.

3. The system of claim 2 wherein:
   said communications link is a telephone communications system and said communications link establishing means includes a dialer and means for transmitting the results of the comparison through said telephone system to said central office.

4. The system of claim 2 wherein:
   said central office includes means located thereat for communicating the assigned transmitter ID number to said remote location in reply to the establishing of the communications link.

5. A remote confinement system for monitoring from a central office the presence of a specified prisoner at a remote confinement location at which the specified prisoner is assigned for unsupervised confinement, said system comprising:
   a transmitter having attached thereto means for securing said transmitter to the body of the specified prisoner, said transmitter including means for transmitting a signal carrying characteristic information of the identity of said transmitter;
   a receiver at said remote location for receiving said signal from said transmitter when said prisoner is within proximity to said remote location;
   means at said remote location for generating an alarm signal perceivable by a person in proximity to said remote location in response to the absence of a received signal from said transmitter by said receiver; and
   means for establishing a communications link between said remote location and said central office if said absence persists for a specified time after said alarm signal is generated.

6. The system of claim 5 wherein:
   said communicating means includes means at said remote location for establishing said communications link only if said absence persists for said specified time.

7. A remote confinement system for monitoring from a central office the presence of a specified prisoner at a remote confinement location at which the specified prisoner is assigned for unsupervised confinement, said system comprising:
   a remote confinement location at which a specified prisoner is assigned for unsupervised confinement;
   a plurality of means at said remote location for performing a plurality of different supervised tests for compliance by the prisoner with a term of the prisoner's confinement;
   means at said remote location for generating a signal carrying information from said tests;
   means for establishing a communications link between said remote location and said central office;
   means for communicating from said central office to said remote location information for selecting at least one of said tests from the plurality of tests to be performed; and
   means at said remote location for activating said test performing means so as to cause the performance of the tests selected.

8. The remote confinement system of claim 7 wherein said test performing means comprises:
   a transmitter having attached thereto means for securing said transmitter to the body of the specified prisoner, said transmitter including means for transmitting a signal carrying characteristic information of the identity of said transmitter; and
   a receiver at said remote location for receiving said signal from said transmitter when said prisoner is within proximity to said remote location.

9. The system of claim 7 wherein said test performing means includes means for testing a person at said remote location for alcohol consumption.

10. The system of claim 9 further comprising means at said remote location for analyzing the voice of the person tested for alcohol consumption to determine whether the person is the specified prisoner.

11. The system of claim 7 wherein said test performing means includes means for verifying the identity of a person at the remote location as the specified prisoner.

12. The system of claim 7 wherein said information communicated from said central office includes information for scheduling said tests, and said system further comprises means at said remote location for initiating said selected test in response to said scheduling information.

13. A remote confinement system for monitoring from a central office the presence of a specified prisoner at a remote confinement location at which the specified prisoner is assigned for unsupervised confinement, said system comprising:
   means at said remote location for performing an unsupervised test on a person at said remote location for those effects on said person which a violation of a behavioral condition would produce on the person of the prisoner which would persist subsequent to a violation;

means at said remote location for generating a test signal carrying information of said test;

means at said remote location for generating an identity signal carrying information verifying the identity of the tested person;

means at said remote location for continuously monitoring the proximity of the specified prisoner to said remote location and means for generating a monitor signal carrying information of certain monitored events in response thereto; and means for transmitting said information from said test, identify and monitor signals from said remote location to said central office.

14. The system of claim 13 wherein said test performing means includes means for testing said person for alcohol consumption.

15. The system of claim 13 wherein said identity information carrying signal generating means includes means for testing the voice of said person and to determine whether said person is the specified prisoner.

16. A remote confinement system for monitoring from a central office the presence of a specified prisoner at a remote confinement location at which the specified prisoner is assigned for unsupervised confinement, said system comprising:

a transmitter having attached thereto means for securing said transmitter to the body of the specified prisoner, said transmitter including means for transmitting a signal carrying characteristic information of the identity of said transmitter;

a receiver at said remote location for receiving said signal from said transmitter when said prisoner is within proximity to said remote location;

means at said remote location for performing an identity test on a person thereat and for generating a signal carrying information of the identity of the tested person;

means for transmitting said signals from said remote location to said central office; and said signal generating means including means for deriving information related to a unique identifiable characteristic from a sample of the voice of the tested person.

17. The system of claim 16 further comprising means for performing an automatic voice analysis of the voice sample of the tested person and comparing the results of the analysis with known voice data of the specified prisoner.

18. The system of claim 16 further comprising means at said remote location for storing a voice characteristic of the specified prisoner, means at said remote location for comparing the characteristic derived from the tested person with the known voice characteristic of the specified prisoner.

19. The remote confinement system of claim 16 further comprising:

a processor at said remote location including a memory device for storing a transmitter ID code;

said processor including means for accepting transmitter identity information from said signal, comparing it with the transmitter ID code in said storage device, and generating an output signal carrying the result of the comparison;

means for establishing a communications link between said remote location and said central office; and means for communicating an assigned transmitter ID code from said central office to said remote location corresponding to the characteristic information of the identity of said transmitter;

said processor including means for storing said assigned ID code in said storage device.

20. The remote confinement system of claim 16 further comprising:

means at said central office for generating an alarm signal perceivable by a person in proximity to said remote location in response to the absence of a received signal from said transmitter by said receiver;

means for establishing a communications link between said remote location and said central office if said absence persists for a specified time after said alarm signal is generated.

21. A method of monitoring from a central office the presence at a remote location of a specified prisoner assigned for unsupervised confinement at the remote location, the method comprising the steps of:

providing a transmitter to be secured to the specified prisoner and transmitting therefrom a signal carrying characteristic identity information;

providing a receiver at the remote location and receiving therewith the signal from the transmitter when the transmitter is within transmitting range to the remote location;

generating at the remote location an alarm locally perceivable by a person in said proximity to the remote location in response to the absence of the receipt by the receiver of a signal from the transmitter; and communicating a reporting signal from the remote location to the central office in response to the absence of the receipt by the receiver of a signal from the transmitter within a specified time after the generation of the alarm.

22. The method of claim 21 wherein the generation of the alarm occurs in response to the lapse of a specified time period during which no signal from the transmitter is received by the receiver.

23. A method of monitoring from a central office the presence of a subject at a remote location comprising the steps of:

providing a data storage device at the remote location and downloading information thereto from the central office;

performing a test at the remote location, for the condition of a subject at the remote location, and transmitting information from the test to the central office, in accordance with the information downloaded from the central office.

24. The method of claim 23 further comprising the steps of:

providing a transmitter to be secured to the subject being monitored and transmitting therefrom a ID signal carrying information characteristic of the identity of the transmitter;

providing a receiver at the remote location and receiving therewith the ID signal from the transmitter when the transmitter is within proximity to the remote location; and wherein said downloading step comprises the substeps of communicating from said central office to said remote location a transmitter ID code corresponding to the information characteristic of the identity of said transmitter and storing said transmitter ID code in the data storage device at the remote location; and wherein said testing step includes the substep of comparing the transmitter identity information from said received ID signal with the transmitter ID code stored in said storage device, and generating an output signal carrying the result of the comparison.

25. The method of claim 24 further comprising the step of:

establishing a communications link from the remote location to the central office in response to certain results of the comparison and communicating information from the test through the established communications link to the central office.

26. The method of claim 25 wherein:

said communication link is a telephone communications system and said communications link establishing step includes the steps of automatically dialing a number for the central office; and said information communicating step includes the step of transmitting the communicated information through the telephone system to the control office.

27. The method of claim 25 wherein:

said downloading step includes the step of communicating the assigned transmitter ID number to said remote location in reply to the establishing of the communications link.

28. A method of claim 23 further comprising the steps of:

generating at the remote location an alarm locally perceivable by a person in said proximity to the remote location in response to the absence of the receipt by the receiver of a signal from the transmitter; and communicating a reporting signal from the remote location to the central office in response to the absence of the receipt by the receiver of a signal from the transmitter within a specified time after the generation of the alarm.

29. The method of claim 28 wherein:

the generation of the alarm occurs in response to the lapse of a specified time period during which no signal from the transmitter is received by the receiver.

30. The method of claim 23 further comprising the step of:

establishing a communications link from the remote location to the central office in response to certain results of the comparison and communicating information from the test through the established communications link to the central office.

31. The method of claim 30 further comprising the step of:

establishing a communications link from the remote location to the central office in response to certain results of the comparison and communicating information from the test through the established communications link to the central office;

repeating said downloading step to download additional information to the storage device through the established communications link; and performing a subsequent test at the remote location, for the condition of a subject at the remote location, and transmitting information from the test to the central office, in accordance with the additional information downloaded from the central office.

32. The method of claim 23 further comprising the steps of:

establishing a communications link between the remote location and the central office;

performing said downloading step to download the information to the storage device through the established communications link; and performing the test at the remote location, for the condition of a subject at the remote location, and transmitting information from the test to the central office, in accordance with the information downloaded from the central office.

33. The method of claim 23 wherein:

the downloaded information includes the time of the next test; and the test is performed at the remote location at the time downloaded from the central office.

34. The method of claim 23 wherein:

the downloaded information includes the time of the next communication between the remote location to the central office; and said method further comprises the step of initiating the establishment of a communications link between the remote location and the central office at the time downloaded from the central office and communicating information therethrough from the remote location to the central office.

35. The method of claim 34 further comprising the steps of:

repeating said downloading step through the communications link to download additional information to the storage device through the communications link; and performing a subsequent test at the remote location, for the condition of a subject at the remote location in accordance with the additional information downloaded from the central office.

36. The method of claim 34 further comprising the steps of:

transmitting information from the test to the central office through the established communications link.

37. The of method of claim 23 further comprising the steps of:

providing means at the remote location for performing any of a plurality of different tests;

selecting at least one of the tests in accordance with the information downloaded from the central office; and wherein the test performed is at least one of the selected tests.

38. The of method of claim 23 wherein the subject being monitored is a specified prisoner assigned for unsupervised confinement at the remote location.

39. A method of monitoring from a central office the unsupervised confinement of a specified prisoner at a remote location comprising the steps of:

performing an identity test on a person at the remote location to confirm the identity of the person as that of the specified prisoner;

generating an identity signal at the remote location carrying information from the identity test of the identity of the person;

continuously monitoring the proximity of the specified prisoner to the remote location and generating a monitor signal carrying information of the proximity of the specified prisoner to the remote location; and transmitting information from the identity and monitoring signals from the remote location to the central office.

40. The method of claim 39 further comprising the steps of:

performing an additional test on a person at the remote location for those effects on the person which a violation of a behavioral condition would produce on the person of the prisoner which would persist subsequent to a violation;

generating a signal at the remote location carrying information of the additional test relating to the tested person's compliance with the behavioral condition; and said identity test being performed on the person being tested for the violation of the behavioral condition to confirm that the person so tested for the violation is the specified prisoner.

41. The method of claim 40 wherein the additional test is a blood alcohol test and the behavioral condition is the requirement that the specified prisoner abstain from the consumption of alcohol.

42. The method of claim 39 wherein the identity test is a test requiring the active participation of the person being tested and the proximity test is a passive test performable without the active participation of the specified prisoner.

43. The method of claim 42 wherein the identity test is a test for deriving information related to a unique identifiable characteristic of the person being tested from a sample of the voice of the tested person.

* * * * *